(12) United States Patent
Tasaki et al.

(10) Patent No.: US 10,584,949 B2
(45) Date of Patent: Mar. 10, 2020

(54) WIRELESS DETONATOR, WIRELESS DETONATION SYSTEM, AND WIRELESS DETONATION METHOD

(71) Applicants: NOF CORPORATION, Shibuya-ku, Tokyo (JP); FUTABA CORPORATION, Mobara-shi, Chiba (JP)

(72) Inventors: Yoji Tasaki, Aichi (JP); Satoshi Hikone, Aichi (JP); Shinya Tanaka, Aichi (JP); Kohichi Shimazaki, Mobara (JP); Kazuhito Watanabe, Mobara (JP); Michihiro Takayasu, Mobara (JP)

(73) Assignees: NOF CORPORATION, Tokyo (JP); FUTABA CORPORATION, Mobara-Shi, Chiba (JP)

( * ) Notice: Subject to any disclaimer, the term of this patent is extended or adjusted under 35 U.S.C. 154(b) by 21 days.

(21) Appl. No.: 16/095,161

(22) PCT Filed: Apr. 19, 2017

(86) PCT No.: PCT/JP2017/015762
§ 371 (c)(1),
(2) Date: Oct. 19, 2018

(87) PCT Pub. No.: WO2017/183662
PCT Pub. Date: Oct. 26, 2017

(65) Prior Publication Data
US 2019/0137249 A1 May 9, 2019

(30) Foreign Application Priority Data

Apr. 20, 2016 (JP) .................................. 2016-084479
Jan. 13, 2017 (JP) .................................. 2017-004521

(51) Int. Cl.
*F42C 13/04* (2006.01)
*H01Q 1/22* (2006.01)
(Continued)

(52) U.S. Cl.
CPC .............. *F42C 13/047* (2013.01); *F42D 1/04* (2013.01); *H01Q 1/22* (2013.01); *H01Q 7/06* (2013.01); *H01Q 21/24* (2013.01); *H02J 50/10* (2016.02)

(58) Field of Classification Search
CPC ......... F42C 13/047; F42C 13/04; H02J 50/10; F42D 1/04; H01Q 1/22; H01Q 7/06; H01Q 21/24
(Continued)

(56) References Cited

U.S. PATENT DOCUMENTS 1,757,288 A * 5/1930 Bleecker ................... F42D 1/05
102/322
1,943,725 A * 1/1934 Dudley .................. G01V 1/104
181/116
(Continued)

FOREIGN PATENT DOCUMENTS

JP H08-219700 A 8/1996
JP 2001-153598 A 6/2001
(Continued)

OTHER PUBLICATIONS

European Patent Office, Supplementary European Search Report, issued in EP Patent Application No. EP17 785 999.8, which is a European counterpart of U.S. Appl. No. 16/095,161, dated Nov. 20, 2019, 15 pages.
(Continued)

*Primary Examiner* — John Cooper
(74) *Attorney, Agent, or Firm* — Amster, Rothstein & Ebenstein LLP

(57) ABSTRACT

A wireless detonator (10) includes a detonation side receiving antenna (11), a detonation side transmitting antenna (18),
(Continued)

an initiator (14) and a detonation side electronic circuit. The detonation side receiving antenna (11) receives energy for driving the detonation side electronic circuit, a control signal and an initiation signal. The detonation side electronic circuit receives the energy, the control signal and the initiation signal via the detonation side receiving antenna (11), transmits a response signal via the detonation side transmitting antenna (18) and ignites the initiator (14) in accordance with the initiation signal. A response frequency of the response signal is set to be greater than or equal to 100 MHz and less than or equal to 1 GHz.

19 Claims, 18 Drawing Sheets

(51) Int. Cl.
*H01Q 7/06* (2006.01)
*H01Q 21/24* (2006.01)
*F42D 1/04* (2006.01)
*H02J 50/10* (2016.01)

(58) Field of Classification Search
USPC .......................................... 102/311, 301, 206
See application file for complete search history.

(56) References Cited

U.S. PATENT DOCUMENTS

| | | | | |
|---|---|---|---|---|
| 3,616,754 A | * | 11/1971 | Frenkel | F42C 13/04 |
| | | | | 102/214 |
| 7,958,824 B2 | * | 6/2011 | Stewart | F41A 17/066 |
| | | | | 102/301 |
| 7,961,103 B2 | * | 6/2011 | Andrenko | G06K 19/041 |
| | | | | 102/206 |
| 2005/0103219 A1 | * | 5/2005 | McClure | F42D 1/055 |
| | | | | 102/311 |
| 2016/0003599 A1 | * | 1/2016 | Hikone | F42D 1/045 |
| | | | | 102/301 |
| 2016/0195379 A1 | * | 7/2016 | Van Wyk | F42D 1/05 |
| | | | | 102/215 |

FOREIGN PATENT DOCUMENTS

| | | |
|---|---|---|
| JP | 2001-330400 A | 11/2001 |
| JP | 2008-211497 A | 9/2008 |
| JP | 2013-019605 A | 1/2013 |
| JP | 2014-134298 A | 7/2014 |

OTHER PUBLICATIONS

International Search Report received for PCT Patent Application No. PCT/JP2017/015762 dated Jun. 27, 2017, 3 pages (1 page of English Translation and 2 pages of PCT search report).

\* cited by examiner

WIRELESS DETONATOR, WIRELESS DETONATION SYSTEM, AND WIRELESS DETONATION METHOD

CROSS REFERENCE TO RELATED APPLICATIONS

This application is a § 371 US national stage of International Application No. PCT/JP2017/015762 filed on Apr. 19, 2017, and claims the benefit of and priority to Japanese Patent Application No. 2016-084479 filed on Apr. 20, 2016 and Japanese Patent Application No. 2017-004521 filed on Jan. 13, 2017, the contents of each of which are hereby incorporated by reference in their entirety.

BACKGROUND

The present disclosure relates to a wireless detonator attached to explosives used in tunnel excavation, a wireless detonation system using the wireless detonator, and a wireless detonation method using the wireless detonator.

According to a conventional blasting operation for a tunnel excavation site etc., a plurality of blast holes are drilled in a blasting face which is an excavation surface. A blast hole has, for example, a diameter of approximately several centimeters and a depth, in an excavation direction, of approximately several meters. A wireless detonator, as well as an explosive which can be wirelessly initiated, are both inserted into each of the blast holes. A blasting controller and a blasting controller side antenna are provided in a location remote from the blasting face. The blasting controller and the blasting controller side antenna are used to wirelessly transmit control signals and an initiation signal to the detonator and explosive. The explosives are initiated to blast based on the signal transmitted from a wireless transmitter. For such initiation, various blasting methods are disclosed.

A magnetic field or electric field may be generated around the blasting controller side antenna. Each wireless detonator includes an antenna to receive energy in the form of control signals from the blasting controller, for driving a detonation side electronic circuit utilizing the magnetic field or electric field in a wireless manner. Each wireless detonator receives a wireless control signal (including ID request signal and preparation start signal for an electronic circuit) and an initiation signal to be initiated. Therefore, the antenna of the wireless detonator needs to be capable of performing several functions. The first function needed is to receive energy for driving a detonation side electric circuit. The second function needed is to efficiently receive the wireless control signals and initiation signal. The third function needed is to efficiently transmit a reply signal in response to the received control signals toward the blasting controller.

Examples of such devices are known in the prior art. For example, Japanese Laid-Open Patent Publication No. 2014-134298 (298 publication) describes a wireless detonator having a detonation side antenna (corresponding to an antenna for a wireless detonator) made of a wound coil in a cylindrical shape. The detonation side antenna is arranged within the blast hole so that a longitudinal axial direction of the cylindrical shape coincides with the longitudinal axis of the blast hole.

Japanese Laid-Open Patent Publication No. H08-219700 (700 publication) describes a receiving detonator device (corresponding to the wireless detonator) having a receiving coil (corresponding to the antenna for the wireless detonator). The receiving coil includes a conductive wire wound around an axis corresponding to the longitudinal axial direction of the receiving detonator.

Japanese Laid-Open Patent Publication No. 2001-330400 (400 publication) describes a wireless detonator having a receiving coil (corresponding to the antenna for the wireless detonator). The receiving coil serves to receive an alternating magnetic field energy which is wirelessly transmitted from a blasting controller side antenna.

Japanese Laid-Open Patent Publication No. 2001-153598 (598 publication) describes a wireless detonation unit (corresponding to the wireless detonator) having a receiving coil (corresponding to the antenna for the wireless detonator). The receiving coil serves to receive alternating magnetic field energy which is wirelessly transmitted from a blasting controller side antenna.

Japanese Laid-Open Patent Publication No. 2013-019605 (605 publication) discloses a wireless detonation system having a blasting controller side antenna and a detonation side antenna (corresponding to the antenna for the wireless detonator). The blasting controller side antenna serves as both a transmitting antenna and a receiving antenna for the blasting controller. The detonation side antenna serves as both a transmitting antenna and a receiving antenna for the wireless detonator.

An example of such a device is shown in FIG. 5, including a blasting controller side transmitting antenna 60 that is wound a plurality of times around the perimeter of a planar cross-section of an inner wall of a tunnel. The blasting controller side transmitting antenna 60 is stretched on the inner wall of the tunnel at a position away from the blasting face 41 at a distance L1. The direction of a magnetic field generated around the blasting controller side transmitting antenna 60 is substantially along to the longitudinal direction of the tunnel (in this case, the Z-axis direction), and is orthogonal to the blasting face 41 in the vicinity of a center of the wound blasting controller side transmitting antenna 60 as indicated by the dot chain line in FIG. 3 extending in the Z-axis. However, the direction of the magnetic field in the vicinity of an edge spaced apart from the center of the wound blasting controller side antenna 60 is significantly curved with respect to the direction orthogonal to the blasting face 41. Specifically, in an example of FIG. 5, in an explosive-charge position P2b in the vicinity of the center of the wound blasting controller side transmitting antenna 60, the direction of the magnetic field comprises only a component in the Z-axis direction. Therefore, in this position, the antenna made of a conductive wire wound around the Z-axis direction as an axis can efficiently receive the energy, control signals and initiation signals.

However, according to the example of FIG. 5, for example, in an explosive-charge position P3c, which is a position in the vicinity of the edge of the wound blasting controller side antenna 60, the direction of the magnetic field includes a component in an X-axis direction, a component in a Y-axis direction and a component in the Z-axis direction. In addition, the magnitude of the component in the Z-axis direction may be smaller than the magnitude of the component in the X-axis direction or in the Y-axis direction. Therefore, for example, in the explosive-charge position P3c, the antenna made of the conductive wire wound around the Z-axis direction as an axis cannot efficiently receive the energy, due to directional distortion. Consequently, it does not efficiently receive the wireless control signals and the initiation signals.

According to the disclosures of the 298 publication and the 700 publication, the conductive wire of the antenna for the wireless detonator is wound in a cylindrical manner, and is arranged within the blast hole such that the longitudinal axis-direction of the cylindrical shape in which the conductive wire is wound extends along the longitudinal axis direction of the blast hole (i.e., Z-axis direction in FIG. 5). Therefore, the antenna for the wireless detonator in the vicinity of the center of the wound blasting controller side antenna can efficiently receive the energy as well as the wireless control signals and the initiation signals. However, the region of the antenna for the wireless detonator not near the vicinity of the center of the wound blasting controller side antenna, but rather at the edge of the wound blasting controller side antenna, for the same reasons as described above may not efficiently receive the energy as well as the wireless control signals and the initiation signals.

In the disclosure described in the 400 publication and the 598 publication, descriptions regarding the winding direction of the conductive wire for the receiving coil corresponding to the antenna for the wireless detonator are not found. The antenna may be considered to be made of a conductive wire wound in a cylindrical shape similar to the 298 publication and the 700 publication.

According to the disclosure described in 605 publication, the blasting controller side antenna for the blasting controller serves the dual purpose of both transmitting and receiving signals. Similarly, the detonation side antenna for the wireless detonator serves the dual purpose of both transmitting and receiving signals. Frequencies of the control signals and the initiation signals transmitted from the blasting controller and received by the wireless detonator (operation frequency) are different from the frequency of response signals (response frequency) transmitted from the wireless detonator and received by the blasting controller. The operation frequency is preferably set between 100 kHz to 500 kHz to efficiently feed electric power wirelessly to the wireless detonator (delivery of the energy for ignition and the energy for driving a detonation-side electronic circuit) and to prevent the generation of standing wave. However, in order to act as a dual-purpose device, and also be capable of use to transmit and receive signals efficiently, the band range thereof is limited with respect to the band for the operation frequency. Therefore, it is not possible to freely select the response frequency in accordance with the condition at the site where the wireless detonation system is used. That is, the response frequencies that can be efficiently transmitted and received may be different depending on the condition at the site, and this variable is not accounted for in the flexibility of the band range of the blasting controller.

Therefore, given this context, there is a need for a type of wireless detonator, a wireless detonation system and a method for wireless detonation using the wireless detonator, wherein the wireless detonator can efficiently receive energy, control signals and initiation signals for driving a detonation side electronic circuit without being affected by a positional relation between a blasting controller side antenna and an antenna for the wireless detonator, as well as having a high degree of flexibility in selection of a response frequency of a response signal, and which can efficiently transmit response signals, and which also allows for reduction in size.

SUMMARY

According to one aspect of the present disclosure, a wireless detonator may comprise a detonation side electronic circuit, a detonation side receiving antenna, a detonation side transmitting antenna, and an initiator. The detonation side receiving antenna receives energy for driving the detonation side electronic circuit, as well as a control signal, and an initiation signal, in a wireless manner. The detonation side transmitting antenna transmits a response signal in response to the control signal in a wireless manner. The detonation side electronic circuit receives the energy for driving the circuit, the control signal and the initiation signal via the detonation side receiving antenna, and transmits the response signal via the detonation side transmitting antenna, and ignites the initiator based on the initiation signal. A response frequency, which is a frequency of the response signal transmitted from the detonation side transmitting antenna is set to be greater than or equal to 100 MHz and less than or equal to 1 GHz.

Since an antenna is used both for a detonation side receiving antenna and a detonation side transmitting antenna, the size of the antenna may be increased depending on the corresponding band used for the operation frequency as well as the corresponding band used for the response frequency. In view of the above, in the present aspect of the present disclosure, separate antennas are used, where the detonation side receiving antenna is dedicated for reception and the detonation side transmitting antenna is dedicated for transmission. This configuration may avoid the need for the antenna to be increased in size, since the size of separate dedicated antennas only corresponds to one frequency instead of two. An additional benefit of having the detonation side transmitting antenna dedicated for transmission is that flexibility for selection of the response frequency is high without affecting the detonation side receiving antenna. The frequency of the response signal may be set to be greater than or equal to 100 MHz and less than or equal to 1 GHz. This allows the detonation side transmitting antenna to be reduced in size and to transmit the response signal efficiently.

According to another aspect of the present disclosure, the detonation side transmitting antenna is disposed in a location extending to the exterior of the detonation side receiving antenna of the wireless detonator, and is positioned so as not to come in contact with the detonation side receiving antenna. Therefore, the downsized detonation side transmitting antenna is easily used because it can be integrally formed with the wireless detonator. Further, in contrast to the case where the wireless detonator is configured as a separate component from the detonation side transmitting antenna, wherein the wireless detonator and the detonation side transmitting antenna are connected to each other via a conductive wire as a connection between the separate antennas, having the wireless detonator integrally formed with the detonator side transmitting antenna can prevent disconnection of the conductive wire connecting the separate antennas, for example, when the wireless detonator is charged into the blast hole.

According to another aspect of the present disclosure, a predetermined direction is determined as the Z-axis, an axis orthogonal to the Z-axis is determined as the X-axis and an axis orthogonal to both the Z-axis and the X-axis is determined as the Y-axis. The detonation side receiving antenna comprises a receiving antenna for Z-axial direction configured with a conductive wire wound around the Z-axis as well as a first magnetic body, a receiving antenna for X-axial direction with a conductive wire wound around the X-axis as well as a second magnetic body, and a receiving antenna for Y-axial direction with a conductive wire wound around the Y-axis as well as a third magnetic body.

Therefore, with this configuration the receiving antenna for the Z-axis can efficiently receive the energy with respect to the magnetic field component in the Z-axis direction in FIG. 5, and can efficiently receive the wireless control signal and the ignition signal. Similarly, the receiving antenna for the X-axis can efficiently receive the energy with respect to the magnetic field component in the X-axis direction, and can efficiently receive the wireless control signal and the ignition signal. The receiving antenna for Y-axial direction can efficiently receive the energy with respect to the magnetic field component in the Y-axis direction, and can efficiently receive the wireless control signal and the ignition signal. The detonation side receiving antenna thus comprises three antennas. As compared to the case where the detonation side receiving antenna only includes one antenna, this configuration can efficiently receive the energy as well as the wireless control signal and the ignition signal no matter where the blast hole is drilled in a blasting face.

According to another aspect of the present disclosure, the wireless detonator is accommodated in a tubular case and comprises an auxiliary transmission antenna that is made of a conductive material with a predetermined length, that complements transmission from the detonation side transmitting antenna. The auxiliary transmission antenna comprises a lead portion and a guide portion. The guide portion is formed as one end of the auxiliary transmission antenna and is attached to at least either an outer side or an inner side of a part of the tubular case. The lead portion is formed as the other end of the auxiliary transmission antenna and extends away from the tubular case. The auxiliary transmission antenna is disconnected from the detonation side transmitting antenna.

For example, when the wireless detonator is charged in the blast hole, a transmitted signal from the detonation side antenna may be received at the guide portion of the auxiliary transmission antenna in a contactless manner and be transmitted from the lead portion of the antenna even when the transmitted signal from the detonation side transmission antenna disposed in a deeper part of the blast hole is interrupted by a rock. This configuration helps to complement the transmission from the detonation side transmitting antenna. Further, since the auxiliary transmission antenna is not connected to the detonation side transmitting antenna, even when the auxiliary transmission antenna caches static electricity, leakage current (from the surrounding high-voltage wires), or stray current (flowing in the ground for some reasons) present in the blast hole, they can be prevented from being transmitted to and affecting the detonation side electronic circuit via the detonation side transmitting antenna.

Another aspect of the present disclosure includes a wireless detonation system comprising a wireless detonator, an explosive, a blasting controller, and a blasting controller side transmitting antenna. The wireless detonator is attached to the explosive, and the explosive is charged into the blast hole drilled into a location to be blasted. The blasting controller side transmitting antenna is stretched on a blasting face or around an outer periphery of the blasting face. The blasting controller side receiving antenna is a different antenna from the blasting controller side transmitting antenna, and is arranged at a depth of 0 m to 100 m in the blast hole. The blasting controller is arranged in a remote location away from the blast hole, and serves to transmit the energy for driving the detonation side electronic circuit, and to transmit the control signal and the initiation signal to the wireless detonator in a wireless manner, and receive the response signal from the wireless detonator in a wireless manner. Therefore, the aforementioned wireless detonator can be used in the wireless detonation system.

A further aspect of the present disclosure includes a wireless detonation system comprising a wireless detonator, an explosive, a blasting controller, and a blasting controller side transmitting antenna. The wireless detonator may be attached to the explosive, and the explosive is charged into the blast hole drilled in a location to be blasted, where it is charged into the blast hole so that the other end of the auxiliary transmission antenna of the wireless detonator is suspended from an opening of the blast hole. The blasting controller side transmitting antenna may be stretched on the blasting face or around the outer periphery of the blasting face. The blasting controller side receiving antenna is a separate and independent antenna from the blasting controller side transmitting antenna, and is arranged at a depth of 0 m to 100 m in the blast hole. The blasting controller is arranged in a remote location away from the blast hole, and serves to transmit the energy for driving the detonation side electronic circuit, and to transmit the control signal and the initiation signal to the wireless detonator in a wireless manner and to receive the response signal from the wireless detonator in a wireless manner. Therefore, the aforementioned wireless detonator can be used in the wireless detonation system.

With this configuration, the response signal from the wireless detonator can be transmitted more efficiently by arranging the auxiliary transmission antenna of the wireless detonator such that a length of the antenna longer than ¼ of the transmission signal is suspended from the opening of the blast hole.

According to another aspect of the present disclosure, a wireless detonation method utilizing a wireless detonator may comprise (a) a step of drilling a blast hole, (b) a step of charging explosives, (c) a step of installing a blasting controller side transmitting antenna, (d) a step of installing a blasting controller side receiving antenna, (e) a step of transmitting an electronic circuit preparation start signal, (f) a step of transmitting a response signal indicative of an electronic circuit preparation completion, (g) a step of transmitting an initiation signal and (h) a blasting step. In step (a), the step of drilling the blast hole, the blast hole is drilled in a location to be blasted. In step (b), where the explosives are charged in the hole, a primary charge explosive with the wireless detonator and a secondary charge explosive without the wireless detonator, are both charged into the blast hole. In step (c), involving installing the blasting controller side transmitting antenna, the blasting controller side transmitting antenna is extended in a loop shape at a position away from a location to be blasted at a first predetermined distance. In step (d), involving installing the blasting controller side receiving antenna, the blasting controller side receiving antenna is installed at a position away from the location to be blasted at a second predetermined distance. In step (e), involving transmission of the electronic circuit preparation start signal, the blasting controller transmits the electronic circuit preparation start signal with an operation frequency of greater than or equal to 100 kHz, and less than or equal to 500 kHz, via the blasting controller side transmitting antenna, from the blasting controller to the wireless detonator, wherein the electronic circuit preparation start signal comprises a control signal, which allows the wireless detonator to start the electronic circuit preparation, and to start the energy for driving. In step (f), involving transmission of the response signal indicative of electronic circuit preparation completion, the wireless detonator receives the electronic circuit preparation start signal via the detonation side receiving antenna, the wireless detonator starts the electronic circuit preparation including charging energy for driving and driving of the detonation side electronic circuit, and when the electronic circuit preparation has been completed, the electronic circuit preparation complete signal, which is a response signal indicative of completion of the electronic circuit preparation, is transmitted from the wireless detonator to the blasting controller via the detonation side transmitting antenna of the wireless detonator, at a certain response frequency. In step (g), involving transmission of the initiation signal, after the blasting controller has received the electronic circuit preparation complete signal via the blasting controller side receiving antenna, the blasting controller transmits the initiation signal at a certain operation frequency via the blasting controller side transmitting antenna from the blasting controller to the wireless detonator. In the blasting step (h), the wireless detonator receives the initiation signal via the detonation side receiving antenna, and subsequently the wireless detonator ignites and initiates the initiator from the detonation side electronic circuit using the charged energy for driving. Therefore, using this wireless detonation method, the aforementioned wireless detonator can be used.

According to another aspect of the present disclosure, a wireless detonation method utilizing a wireless detonator may comprise (a) a step of drilling a blast hole, (b) a step of charging explosives, (c) a step of installing a blasting controller side transmitting antenna, (d) a step of installing a blasting controller side receiving antenna, (e) a step of transmitting an electronic circuit preparation start signal, (f) a step of transmitting a response signal indicative of electronic circuit preparation completion, (g) a step of transmitting an initiation signal and (h) a blasting step. In step (a), the step of drilling the blast hole, the blast hole is drilled in a location to be blasted. In step (b), where explosives are charged in the hole, a primary charge explosive with a wireless detonator and a secondary charge explosive without the wireless detonator are both charged into the blast hole, where the explosives are charged into the blast hole such that the other end of the auxiliary transmission antenna of the wireless detonator is suspended from an opening of the blast hole. In step (c), involving installing the blasting controller side transmitting antenna, the blasting controller side transmitting antenna is extended in a loop shape at a position away from a location to be blasted at a first predetermined distance. In step (d), involving installing the blasting controller side receiving antenna, the blasting controller side receiving antenna is installed at a position away from the location to be blasted at a second predetermined distance. In step (e), involving transmission of the electronic circuit preparation start signal, the blasting controller transmits the electronic circuit preparation start signal with an operation frequency of greater than or equal to 100 kHz, and less than or equal to 500 kHz, via the blasting controller side transmitting antenna, from the blasting controller to the wireless detonator, wherein the electronic circuit preparation start signal comprises a control signal, which allows the wireless detonator to start an electronic circuit preparation, and to start the energy for driving. In step (f), involving transmission of the response signal indicative of electronic circuit preparation completion, the wireless detonator receives the electronic circuit preparation start signal via the detonation side receiving antenna, the wireless detonator starts the electronic circuit preparation including charging energy for driving and driving of the detonation side electronic circuit, and when the electronic circuit preparation has been completed, the electronic circuit preparation complete signal, which is a response signal indicative of completion of the electronic circuit preparation, is transmitted from the wireless detonator to the blasting controller via the detonation side transmitting antenna of the wireless detonator, at a certain response frequency. In step (g), involving transmission of the initiation signal, after the blasting controller has received the electronic circuit preparation complete signal via the blasting controller side receiving antenna, the blasting controller then transmits the initiation signal with the operation frequency from the blasting controller to the wireless detonator via the blasting controller side transmitting antenna. In the blasting step (h), the wireless detonator receives the initiation signal via the detonation side receiving antenna, and subsequently the wireless detonator ignites and initiates the initiator from the detonation side electronic circuit using the charged energy for driving.

Therefore, using this method, the response signal from the wireless detonator can be transmitted more efficiently by arranging the auxiliary transmission antenna of the wireless detonator such that a length of the antenna longer than, e.g., ¼ of the transmission signal is suspended from the opening of the blast hole.

DETAILED DESCRIPTION

Figure 1:
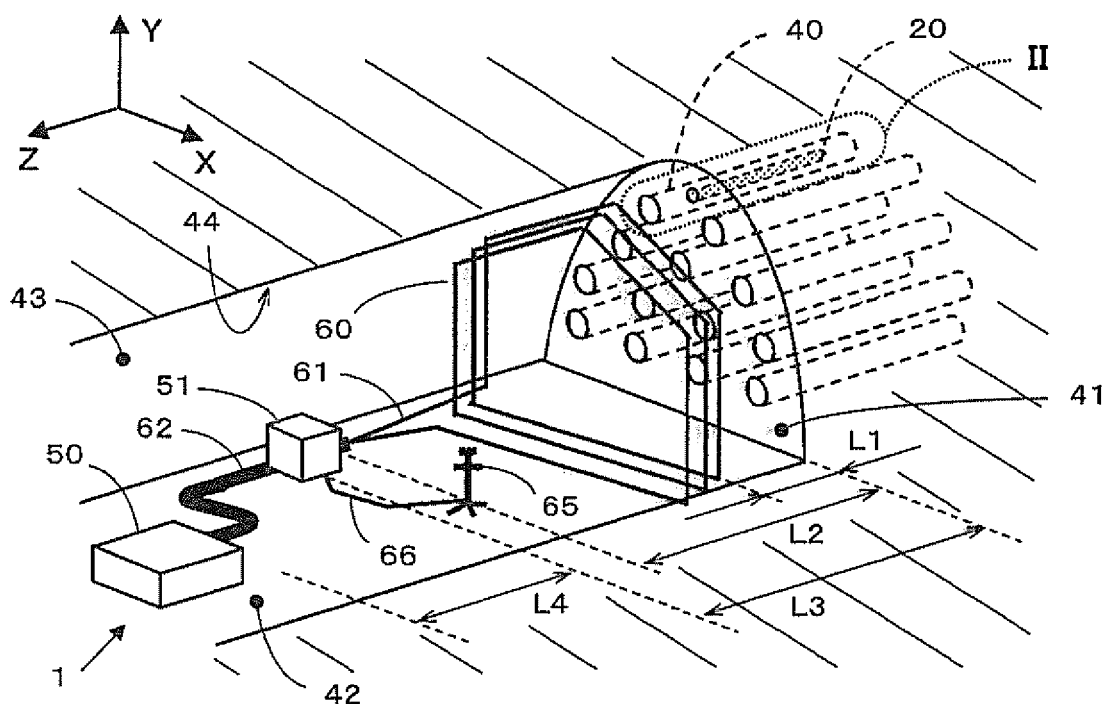
FIG. 1 is a perspective view illustrating an entire structure of a wireless detonation system for blasting a location to be blasted such as a blasting face at a tunnel excavation site.

Hereinafter, exemplary embodiments for carrying out the present disclosure will be described with reference to the drawings in which a tunnel excavation site will be described as an example location. The axes (X-axis, Y-axis, and Z-axis) present in the drawings are all orthogonal with respect to each other, where the Y-axis direction indicates a vertically upward direction. The Z-axis direction corresponds to the longitudinal axial direction of a blast hole 40 oriented in the opposite direction to an excavation direction (horizontal negative Z direction) of the tunnel.

As shown in FIG. 1, a wireless detonation system 1 comprises an explosive unit 20 (see FIG. 2), a blasting controller 50, a relay device 51, a blasting controller side transmitting antenna 60 and a blasting controller side receiving antenna 65. The explosive unit 20 comprises an explosive attached to a wireless detonator wherein the explosive is charged in each blast hole 40 drilled into a blasting face 41 (location to be blasted).

The blasting controller 50 is arranged at a remote location away from the blast holes 40. The blasting controller 50 serves to feed electric current to the blasting controller side transmitting antenna 60 through a firing cable 62, a relay device 51 and a connecting cable 61. Consequently, by feeding of the electric current through the looped shape of the antenna 60, a magnetic field is generated around the transmitting antenna 60 so that control signals (for example, corresponding to an ID request signal, an electronic circuit preparation start signal) and/or initiation signals may be transmitted by the antenna 60. Therefore, the blasting controller 50 delivers energy for driving a detonator side electronic circuit, the control signals, as well as the initiation signals via the transmitting antenna 60 in a wireless manner, through the generated magnetic field, to a controller and an initiator which are part of the wireless detonator 10, via a detonation side receiving antenna 11. The frequency of electric current flowing in the blasting controller side transmitting antenna 60 for generating the magnetic field through which signals are transmitted, and operation frequencies of control signals and initiation signals may be set to be, for example, greater than or equal to 100 kHz and less than or equal to 500 kHz. It is not preferable to set the operation frequencies to be greater than 500 kHz, since standing waves are likely to occur in a tunnel.

The blasting controller 50 receives wireless response signals from the detonation side transmitting antenna 18 (see FIG. 2) of the wireless detonator 10 through the blasting controller side receiving antenna 65, a connecting cable 66, the relay device 51 and the firing cable 62. A response frequency, which is a frequency of response signals (corresponding to the signal indicative of electronic circuit preparation completion) from the wireless detonator 10, is set to be at a predetermined frequency, for example, greater than or equal to 100 MHz and less than or equal to 1 GHz. When the response frequency is set to be higher than 1 GHz, it is difficult for transmission to occur through rocks, and therefore such frequency is not preferable. If the response frequency is greater than or equal to 500 kHz, then standing waves may be generated, but the output of response signals is significantly small compared to the output of energy for driving the detonation side electronic circuit, the control signals as well as the initiation signals. Therefore, the tunnel is unlikely to collapse due to the presence of such standing waves. Even though the output of the response signals is small, the blasting controller side receiving antenna may be installed at a location where the response signals are easily received, thus enhancing signal transfer while mitigating the risk of collapse.

The relay device 51 comprises a tuning circuit. The relay device 51 is provided not only between the blasting controller 50 and the blasting controller side transmitting antenna 60, but also between the blasting controller 50 and the blasting controller side receiving antenna 65. The relay device 51 is electrically connected to the blasting controller 50 through the firing cable 62. The relay device 51 is connected to the blasting controller side transmitting antenna 60 through the connecting cable 61. The relay device 51 is connected to the blasting controller side receiving antenna 65 through the connecting cable 66. The relay device 51 delivers energy for driving the detonation side electronic circuit, the control signals and the initiation signals from the blasting controller 50 to the wireless detonator 10, through the magnetic field generated by the blasting controller side transmitting antenna 60. In this case, the control signals and the initiation signals comprising the energy for driving the detonation side electronic circuit are outputted from the blasting controller 50 to the magnetic field of the blasting controller side transmitting antenna 60 through the connecting cable 61. The relay device 51 receives the response signals transmitted from the wireless detonator 10 to the blasting controller 50 through the blasting controller side receiving antenna 65 and the connecting cable 66, and transmits the response signals to the blasting controller 50.

Figure 34:
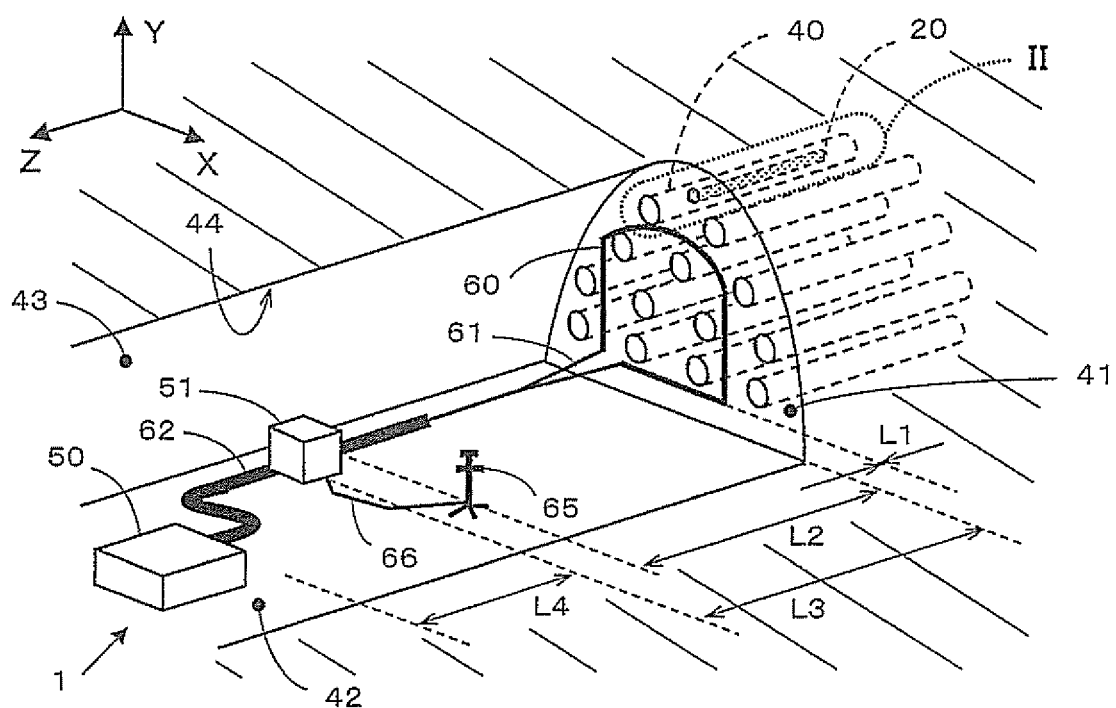
FIG. 34 is a perspective view of the entire structure of another wireless detonation system.

The blasting controller side transmitting antenna 60 is installed at a location which is in the vicinity of the blasting face 41 (blast hole) and which lies away from the blasting face 41 at the distance L1, where L1 is in the range of 0 to 1 m etc. (corresponding to the first predetermined distance), in the longitudinal axial direction of the blast hole (Z-axis direction). For example, FIG. 34 shows an example where the distance L1 in FIG. 1 is determined to be 0 m. In this case, the transmitting antenna 60 is in direct contact with the blasting face. The transmitting antenna 60 may be stretched on the blasting face or around an outer periphery of the blasting face or may extend along the tunnel floor 42, the tunnel side wall 43 and the tunnel ceiling 44 in a loop shape. The transmitting antenna 60 may be wound about the outer periphery a plurality of times, for example, 3 times as shown in FIG. 1, or it may be wound around the outer periphery only once as shown in FIG. 34. The distance L3, from the relay device 51 to the blasting face 41 in the longitudinal axial direction of the blast hole (Z-axis direction), may be, for example, about 50 m. The distance L4, in the longitudinal axial direction of the blast hole (Z-axis direction), from the relay device 51 to the blasting controller 50, may be, for example, about 100 to 300 m. A new blasting controller antenna 60 and a new connecting cable 61 are installed and extend from relay device 51 towards the blasting face 41 every time after blasting.

The blasting controller side receiving antenna 65 is configured, for example, to be in a vertically extending pole shape. The receiving antenna 65 is disposed at a location away from the blasting face 41 (location to be blasted) at the distance L2 (corresponding to a second predetermined distance), in the longitudinal axial direction of the blast hole (Z-axis direction), where L2 may be 0 m to 100 m. A response frequency of a response signal received from the wireless detonator 10 is greater than or equal to 100 MHz and less than or equal to 1 GHz. Therefore, the shape of the receiving antenna 65 may be significantly different from that of the blasting controller side transmitting antenna 60 such that it is not necessary for receiving antenna 65 to be wound largely in a loop shaped manner. Additionally, the blasting controller side receiving antenna 65 and the connection cable 66 do not need to be replaced every time after blasting if the distance L2 from the location to be blasted exceeds a certain predetermined distance.

Figure 2:
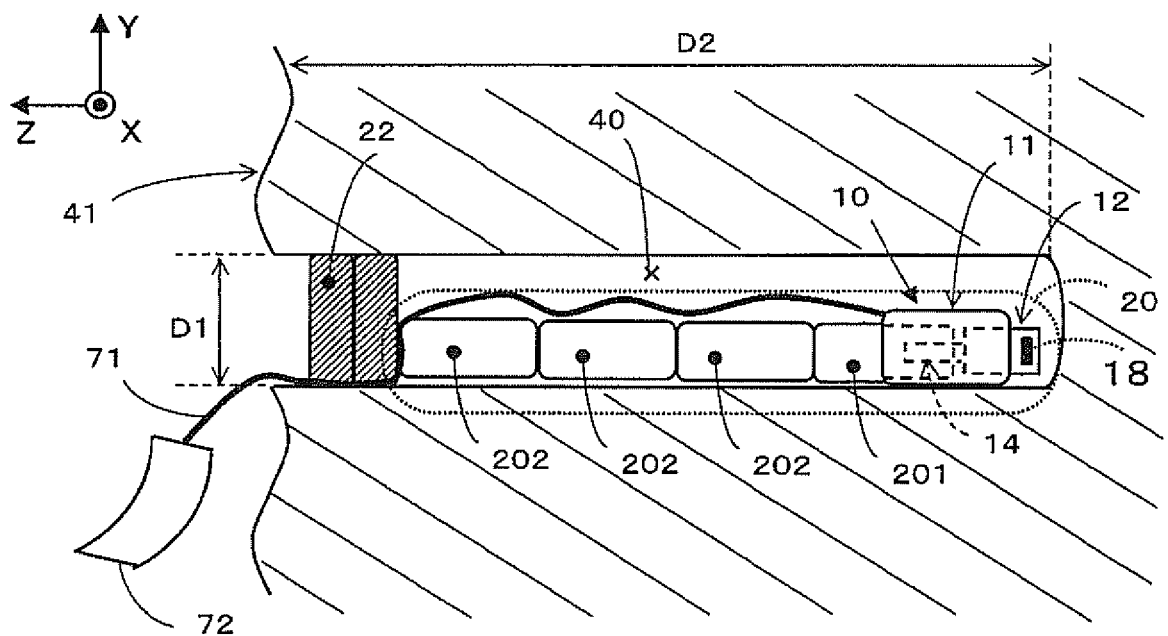
FIG. 2 is an enlarged view at Portion II in FIG. 1, illustrating an example in which an explosive unit utilizing a wireless detonator is charged into a blast hole drilled into a location to be blasted at the blasting face etc.

As shown in FIG. 2, the explosive unit 20, comprising an explosive, is charged into the blast hole 40. The blast hole 40 is a cylindrical-shaped hole drilled into the blasting face 41 such that it has a diameter D1 of about 5 cm and a depth D2 of about 2 m. However, it is not limited to these values. The explosive unit 20 is charged into the blast hole 40 and covered with a tamping material 22 such as clay. The explosive unit 20 comprises a primary charge explosive 201 with a wireless detonator and secondary charge explosives 202. The primary charge explosive 201 with a wireless detonator is configured by attaching the primary charge explosive 201 with the wireless detonator 10 to secondary charge explosives 202. In particular, the primary charge explosive 201 with the wireless detonator is disposed at the foremost portion, closest to the front of the blasting target and away from blasting face 41 in the longitudinal axial direction of the blasting hole (negative Z-axis direction) when charged into the blast hole 40. The secondary charge explosives 202 are attached to the primary charge explosive 201 with a wireless detonator, wherein the quantity of the secondary charge explosives 202 may be appropriately increased or decreased. The explosive unit 20, is a collective explosive that may include only the primary charge explosive 201 with the wireless detonator, or it may additionally comprise secondary charge explosives 202, as desired.

Figure 12:
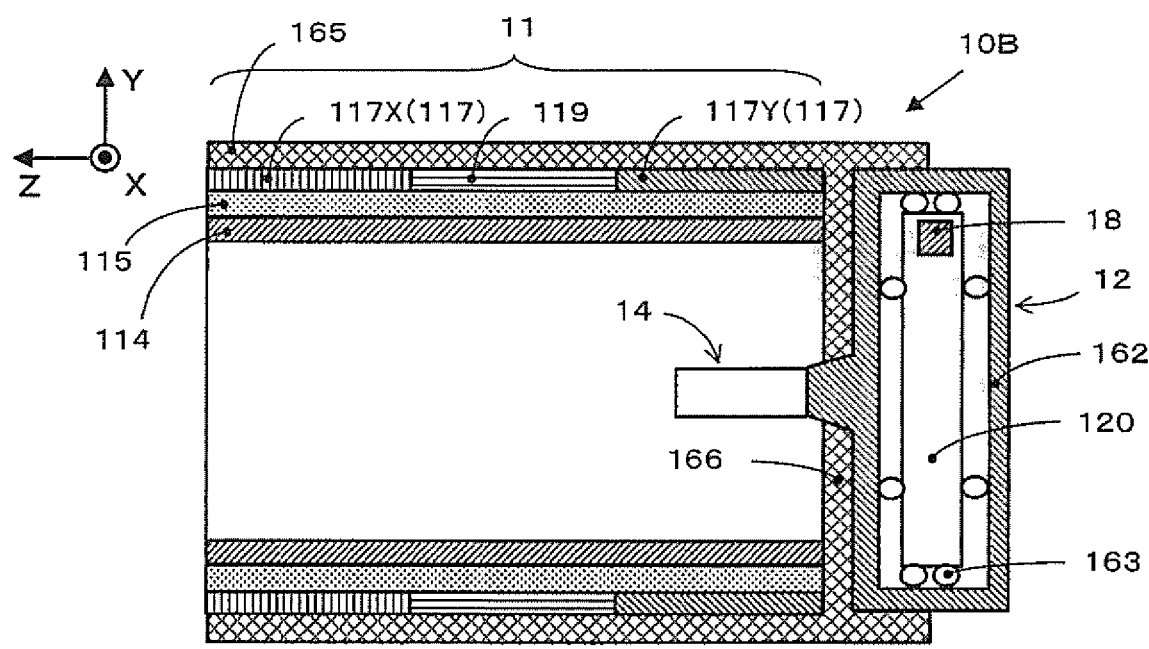
FIG. 12 is a cross-sectional view of an example of a wireless detonator having a different accommodating structure for the controller and the initiator from those of the wireless detonator shown in FIG. 10.

As shown in FIG. 2, the wireless detonator 10 may comprise a substantially tubular detonation side receiving antenna 11, a controller 12, an initiator 14 and a detonation side transmitting antenna 18. The controller 12 and the initiator 14 may be accommodated within the detonation side receiving antenna 11. An inner peripheral diameter of the tubular detonation side receiving antenna 11 is larger than the outer peripheral diameter of the primary and secondary charge explosives. The initiator 14 is inserted into the detonation side receiving antenna 11 along with the primary charge explosive 201 to collectively form the primary charge explosive 201 with the wireless detonator, and the explosive 201 is charged into the blast hole 40. The outer peripheral diameter of the detonation side receiving antenna 11 is smaller than or equal to the inner peripheral diameter of the blast hole 40. As shown in FIG. 12, it is possible to not accommodate the full explosive charge into the detonation side receiving antenna 11, but rather only the initiator 14. The controller 12 may lie outside of the detonator side receiving antenna 11.

As shown in FIG. 2, a display device 72 displays individual pieces of information (for example, a blast initiation delay time or an identification number) by which an operator can identify the wireless detonator 10, and the device is attached to the wireless detonator 10 via a cable 71. The cable 71 is long enough that the display device 72 can reach to the outside of the blast hole 40 when the primary charge explosive 201 with the wireless detonator is charged into the blast hole 40. Accordingly, when the primary charge explosive 201 with the wireless detonator is charged into the blast hole 40, the display device 72 is disposed outside of the blast hole 40.

Alternatively, the cable 71 and the display device 72 illustrated in FIG. 2 may be omitted. Further, in the description of the present exemplary embodiments, an example has been described in which the display device 72 is attached to the wireless detonator 10 via the cable 71. However, as an alternative, the display device 72 may be directly attached to the wireless detonator 10. If the display device is directly attached to the wireless detonator, the operator cannot check the display device after charging the detonator into the blast hole. However, instead, the operator may charge the detonator into blast hole while checking the display device.

Each of the steps for a wireless detonation method utilizing the wireless detonator 10 (structure of which will be described later) will be described with reference to each of steps (a) to (h) and FIGS. 1 and 2.

(a) is a step of drilling blast holes,
(b) is a step of charging explosives,
(c) is a step of installing the blasting controller side transmitting antenna,
(d) is a step of installing the blasting controller side receiving antenna,
(e) is a step of transmitting electronic circuit preparation start signal,
(f) is a step of transmitting a response signal indicative of electronic circuit preparation completion,
(g) is a step of transmitting an initiation signal, and
(h) is a blasting step.

In the step (a) of drilling blast holes, blast holes 40 are drilled in a location to be blasted (e.g. blasting face 41) as shown in FIG. 1.

In the step (b) of charging explosives, the primary charge explosive 201 with a wireless detonator and secondary charge explosives 202 (i.e., collectively, explosive units 20) may be charged into corresponding blast holes 40 as shown in FIG. 2. The primary charge explosives 201 with the wireless detonator are the explosives to which the wireless detonators 10 for each explosive unit 20 are attached. The secondary charge explosives 202 are explosives without the wireless detonator 10.

In the step (c) of installing a blasting controller side transmitting antenna, the blasting controller side transmitting antenna 60 is stretched in a loop shape at a location a first predetermined distance (distance L1) away from the location to be blasted in the longitudinal axial direction of the blast hole 40 (Z-axis direction) as shown in FIG. 1.

In the step (d) of installing a blasting controller side receiving antenna, the blasting controller side receiving antenna 65 is disposed at a location a second predetermined distance (distance L2) away from the location to be blasted in the longitudinal axial direction of the blast hole 40 (Z-axis direction) as shown in FIG. 1.

In the step (e) of transmitting the electronic circuit preparation start signal, the blasting controller 50 transmits the electronic circuit preparation start signals from the blasting controller 50 to the wireless detonators 10 via the blasting controller side transmitting antenna 60. The electronic circuit preparation start signals are sent at operation frequencies that are greater than or equal to 100 kHz and less than or equal to 500 kHz (for example, 200 kHz). These signals are sent along with control signals to start electronic circuit preparation and energy for driving a detonation side electronic circuit.

In the step (f) of transmitting the response signal indicative of the electronic circuit preparation completion, the wireless detonator 10 receives the above-mentioned electronic circuit preparation start signals via the detonation side receiving antenna 11. Upon receipt, the wireless detonator 10 then starts the electronic circuit preparation including charging energy for driving the detonation side electronic circuit and driving of the detonation side electronic circuit. When the above electronic circuit preparation has been completed, the wireless detonator 10 transmits the electronic circuit preparation completion signal to the blasting controller side receiving antenna 65, which is a response signal indicative of the electronic circuit preparation completion with response frequency via the detonation side transmitting antenna 18 from the wireless detonator 10 to the blasting controller 50. The response frequency is greater than or equal to 100 MHz and less than or equal to 1 GHz, for example 315 MHz or 429 MHz.

In the step (g) of transmitting an initiation signal, the blasting controller 50 receives the above-mentioned signal indicative of the electronic circuit preparation completion via the blasting controller side receiving antenna 65. Subsequently, the blasting controller 50 transmits the initiation signal with the same aforementioned operation frequency as the electronic circuit preparation start signals, from the blasting controller 50 to the wireless detonator 10 via the blasting controller side transmitting antenna 60.

In the blasting step (h), the wireless detonator 10 receives the initiation signal via the detonation side receiving antenna 11. Upon receipt, the wireless detonator 10 subsequently allows the initiator 14 to ignite for detonation through the detonation side electronic circuit utilizing the energy for driving the charged detonation side electronic circuit.

Hereinafter, each effect of the wireless detonator 10 will be described. One of the effects is that the energy for driving the detonation side electronic circuit, the control signals and the initiation signals can be efficiently received without affecting the positional relation between the blasting controller side antenna (blasting controller side transmitting antenna, blasting controller side receiving antenna) and the antenna for the wireless detonator (detonation side receiving antenna, detonation side transmitting antenna). One of the other effects is a high degree of flexibility in a selection of the response frequency of the response signal so that the response signal can be efficiently received. One of the other effects is that size of the wireless detonator 10 can be reduced.

Figure 3:
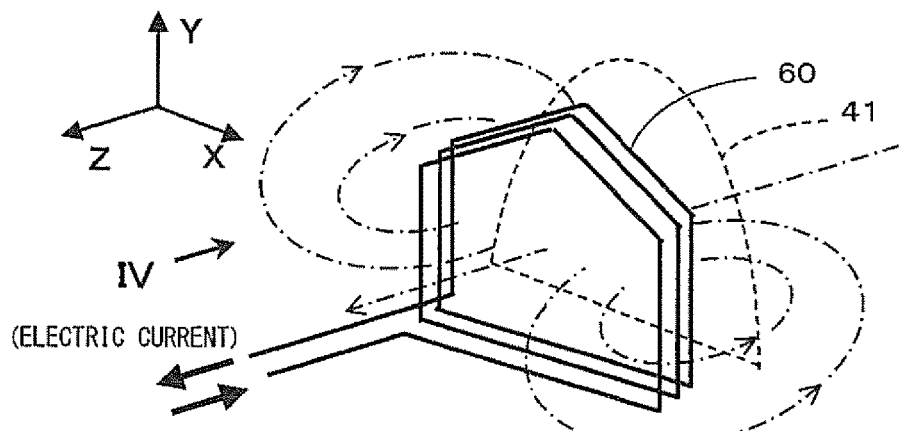
FIG. 3 is a view illustrating an example of directions of a magnetic field generated around a blasting controller side transmitting antenna.
Figure 4:
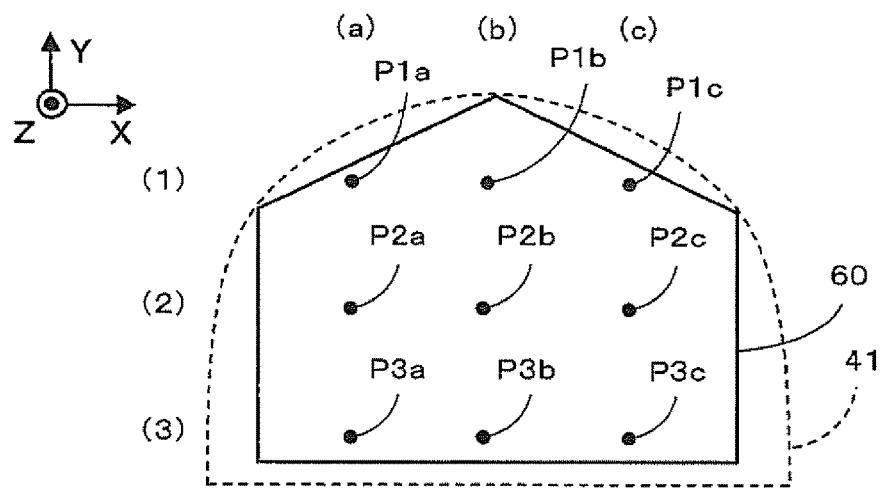
FIG. 4 is a view illustrating a relation between each location of each blast hole and a position of the blasting controller side transmitting antenna shown in FIG. 5.
Figure 5:
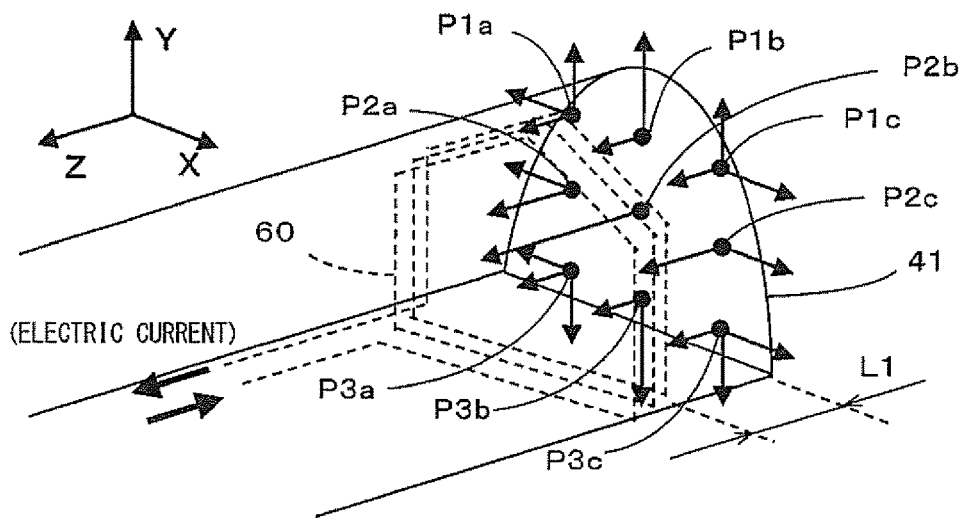
FIG. 5 is a view illustrating an example of each location of each blast hole and magnitudes of the electric field in the Z-axis direction, X-axis direction, and Y-axis direction.

FIGS. 3 to 5 show the directional path of magnetic fields generated around the blasting controller side transmitting antenna 60. FIG. 3 is an isolated view showing only the blasting controller side transmitting antenna 60 extracted from FIG. 1. As shown in FIG. 3, if the electrical current flows through the blasting controller side transmitting antenna 60 in the direction indicated by the solid lines, a magnetic field is generated as indicated by one dot chain lines. With this configuration for transmission of signals, if the conductive wire comprising antenna 60 is wound around an axis that is oriented in the axial direction of this magnetic field, as is the case where antenna 60 is wound around the Z-axial direction of the magnetic field as shown in FIG. 3, then the detonation side receiving antenna 11 for the wireless detonator 10 can most efficiently receive the energy for driving the detonation side electronic circuit and can efficiently receive the wireless control signals as well as the initiation signals.

FIG. 4 is a view of FIG. 3 as seen from the IV direction, or the negative Z axial direction, shown in FIG. 3. The charge position P2b is a position of blast hole in the blasting face 41 substantially corresponding to the center of the wound blasting controller side transmitting antenna 60. The charge position P1a is a position corresponding to an edge of the blasting controller side transmitting antenna 60, to the upper left of the charge position P2b. The charge position P1c is a position corresponding to the edge of the blasting controller side transmitting antenna 60, to the upper right of the charge position P2b. The charge position P1b is a position corresponding to the edge of the blasting controller side transmitting antenna 60, above the charge position P2b. The charge position P2a is a position corresponding to the edge of the blasting controller side transmitting antenna 60, to the left side of the charge position P2b. The charge position P2c is a position corresponding to the edge of the blasting controller side transmitting antenna 60, to the right side of the charge position P2b. The charge position P3a is a position corresponding to the edge of the blasting controller side transmitting antenna 60, to the lower left of the charge position P2b. The charge position P3c is a position corresponding to the edge of the blasting controller side transmitting antenna 60, to the lower right of the charge position P2b. The charge position P3b is a position corresponding to the edge of the blasting controller side transmitting antenna 60, below the charge position P2b.

Figure 8:
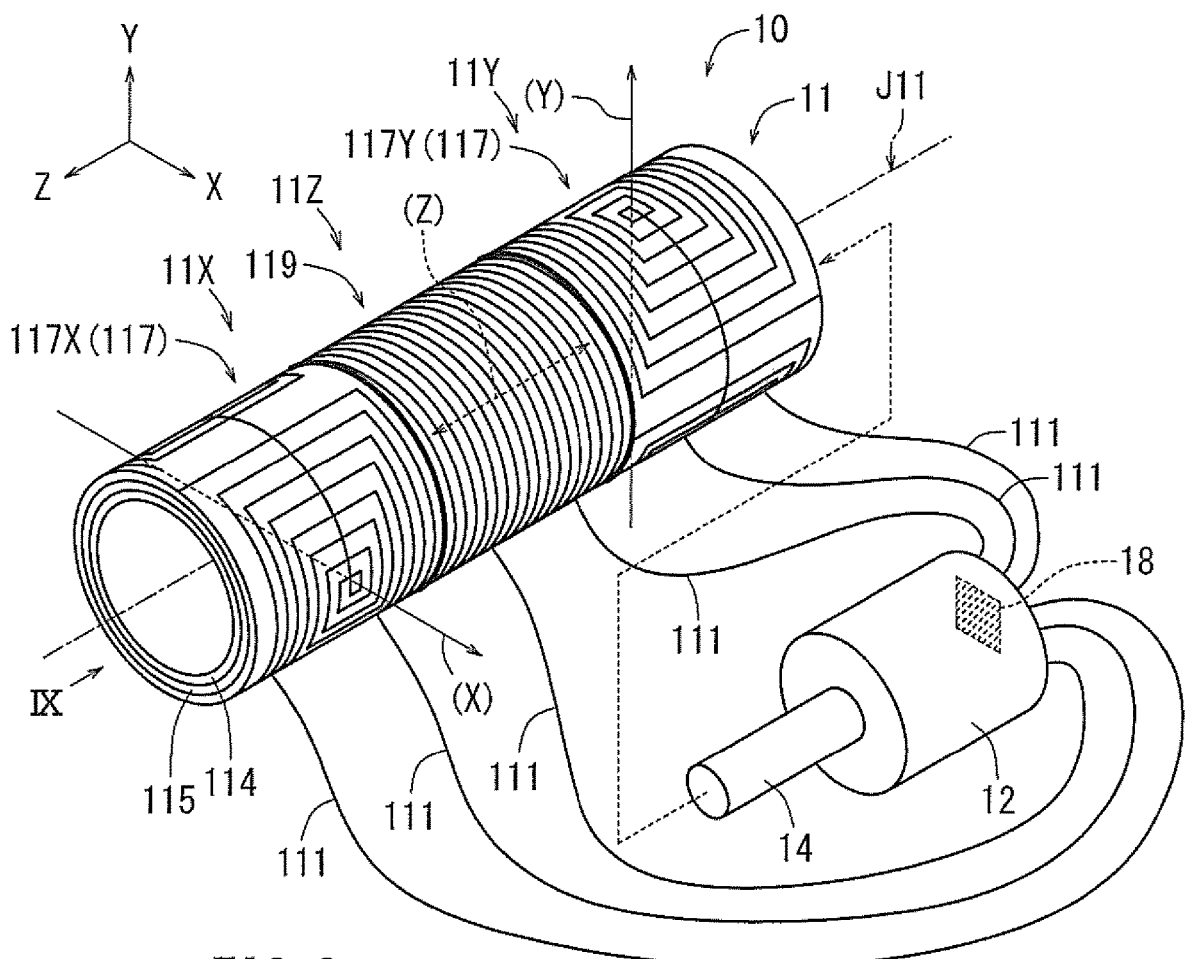
FIG. 8 is an exploded perspective view of the wireless detonator shown in FIG. 6.

FIG. 5 shows the directions and magnitudes of the magnetic field (magnetic field generated around the blasting controller side transmitting antenna 60) associated with each of the positions of the charge positions P1a to P1c, the charge positions P2a to P2c and the charge positions P3a to P3c, in the blasting face 41, as shown in FIG. 4. In the charge position P2b corresponding to the center of the blasting controller side transmitting antenna 60, the component of the magnetic field is distributed entirely in the Z-axis direction. Therefore, transmission of signals by the blasting controller side transmitting antenna 60 may be received efficiently as the energy for driving the detonation side electronic circuit by the detonation side receiving antenna 11, if the antenna 60 is made of conductive wire wound around the Z-axis. For example, a tubular coil 119 for Z-axis and the tubular antenna for Z-axial direction (receiving antenna 11Z for Z-axis) made of the tubular magnetic body shown in FIG. 8 are applicable.

On the other hand, in the vicinity of the edge of the outer periphery of the blasting controller side transmitting antenna 60, the magnitude of the magnetic field in the Z-axis direction is reduced while the magnitudes of the magnetic field in the X-axis direction and/or the magnetic field in the Y-axis direction are increased. For example, in the charge position P3c, the magnitude of the magnetic field in the Z-axis direction is smaller than that in the charge position P2b, while the magnitudes of the magnetic field in the X-axis direction and the magnetic field in the Y-axis direction are greater than the magnitude of the magnetic field in the Z-axis direction. In the charge position P1b, the magnitude of the magnetic field in the Z-axis direction is smaller than that in the charge position P2b while the magnitude of the magnetic field in the Y-axis direction is greater than that in the Z-axis direction. Therefore, in the positions close to the outer peripheral edge of the blasting controller side transmitting antenna 60 such as the charge positions P1a to P1c, the charge position P2a, the charge position P2c, as well as the charge positions P3a to P3c, it is not always possible to efficiently receive the energy for driving the detonation side electronic circuit, the wireless control signals and the initiation signals if the antenna is only made of the conductive wire wound around its Z-axis. For example, it is not always possible to efficiently receive signals if having only the tubular coil 119 for Z-axis and the tubular antenna for Z-axial direction (receiving antenna 11Z for Z-axis) made of a tubular magnetic body in an example illustrated in FIG. 8.

Hereinafter, the detonation side receiving antenna 11 will be described. The detonation side receiving antenna 11 can receive the energy for driving the detonation side electronic circuit efficiently, even when it is arranged (charged) in any blast hole drilled at any location in the blasting face 41. In addition, the detonation side receiving antenna 11 can efficiently receive the wireless control signals and the initiation signals.

The detonation side receiving antenna 11 may also be used as the antenna for transmitting response signals from the wireless detonator 10 to the blasting controller. In this case, if the response frequency is less than 100 MHz, distance of reach of the response signal is short (for example, about several meters), which is not particularly preferable. Conversely, on the other hand, if the response frequency is more than 1 GHz, the signals are easily absorbed in rocks, which is also not particularly preferable. As a result, the preferable response frequency is greater than or equal to 100 MHz and less than or equal to 1 GHz. As a result, the signals are prevented from being absorbed in the rocks, and also reach a sufficient distance to be appropriate. However, if the detonation side receiving antenna 11, capable of efficiently receiving control signals with operation frequency of greater than or equal to 100 kHz and less than or equal to 500 kHz, were also to be used as the transmitting antenna, efficiently transmitting response signals with a response frequency of greater than or equal to 100 MHz and less than or equal to 1 GHz, then the size of the antenna may increase to the point that the antenna would not be able to be charged into the blast hole 40 shown in FIGS. 1 and 2.

To this end, the inventors of the present application have invented a wireless detonator (FIGS. 6 and 7) having the detonation side receiving antenna 11 with a separate detonation side transmitting antenna 18 to achieve the wireless detonator which may fulfill all of the following (1) to (3).

(1) Control signals and initiation signals with operation frequency of greater than or equal to 100 kHz and less than or equal to 500 kHz (including energy for driving the detonation side electronic circuit) can be efficiently received by the detonation side receiving antenna 11 from the blasting controller.

(2) Response signals with response frequency of greater than or equal to 100 MHz and less than or equal to 1 GHz can be efficiently transmitted by the detonation side transmitting antenna 18 to the blasting controller.

(3) The detonation side receiving antenna 11 and the detonation side transmitting antenna 18 should have such a size that collectively they can be charged into a blast hole with a diameter of about 5 cm and a depth of about 2 m.

A structure of the wireless detonator 10 will be described with reference to FIGS. 6 to 12. In the example illustrated in FIG. 6, the controller 12 protrudes outwardly in the longitudinal axial direction (negative Z direction) of the blast hole, from the rear radial center (at the negative-Z-end) of the detonation side receiving antenna 11. The detonation side transmitting antenna 18, at the rear (negative-Z-end) of controller 12, is provided at a position to the exterior of the detonation side receiving antenna 11 where it is spaced apart from, and not in contact with, the detonation side receiving antenna 11. In an example shown in FIG. 7, the controller 12 protrudes outwardly in the longitudinal axial direction (negative Z direction) of the blast hole, from the rear (negative-Z-end) top of the detonation side receiving antenna 11. The detonation side transmitting antenna 18, at the rear (negative-Z-end) of controller 12, is positioned such that it is spaced apart from, and does not contact with, the detonation side receiving antenna 11. FIG. 8 shows an exploded perspective view of the wireless detonator 10 shown in FIG. 6.

Figure 6:
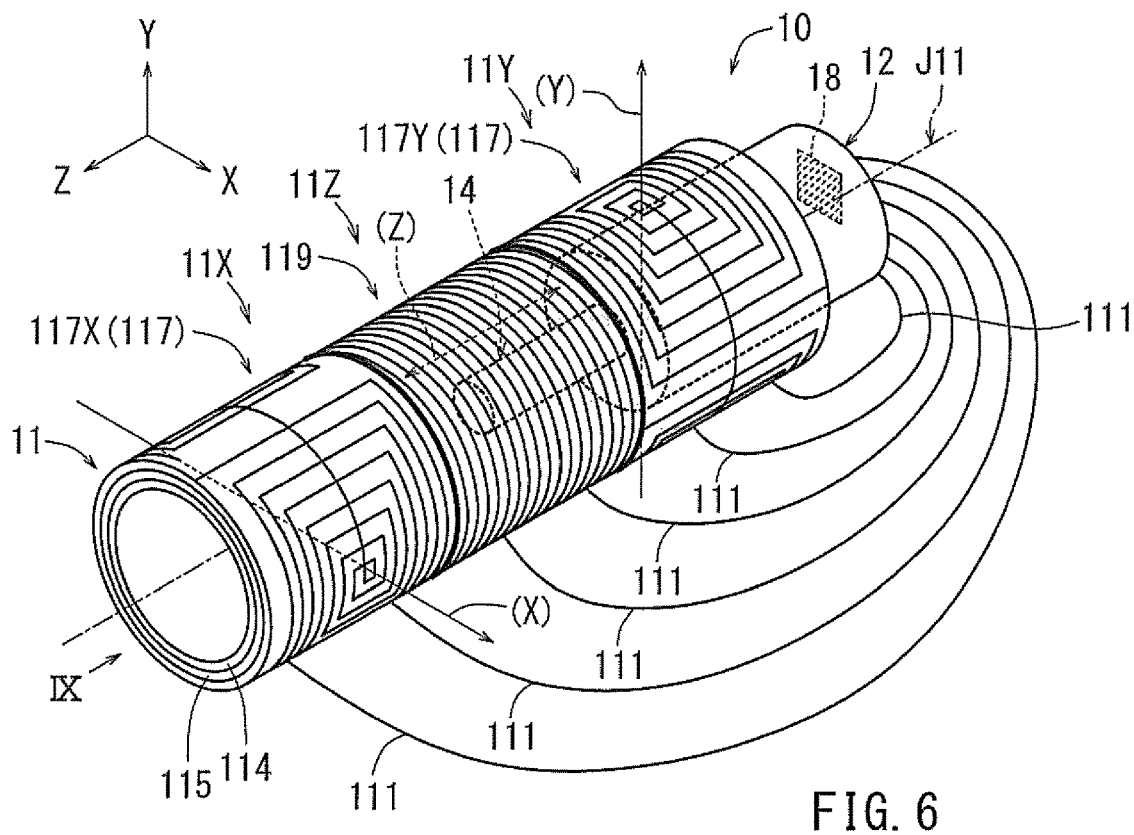
FIG. 6 is a perspective view illustrating an example of an appearance of the wireless detonator in which a detonation side transmitting antenna is provided in a position protruding outward from a detonation side receiving antenna.
Figure 7:
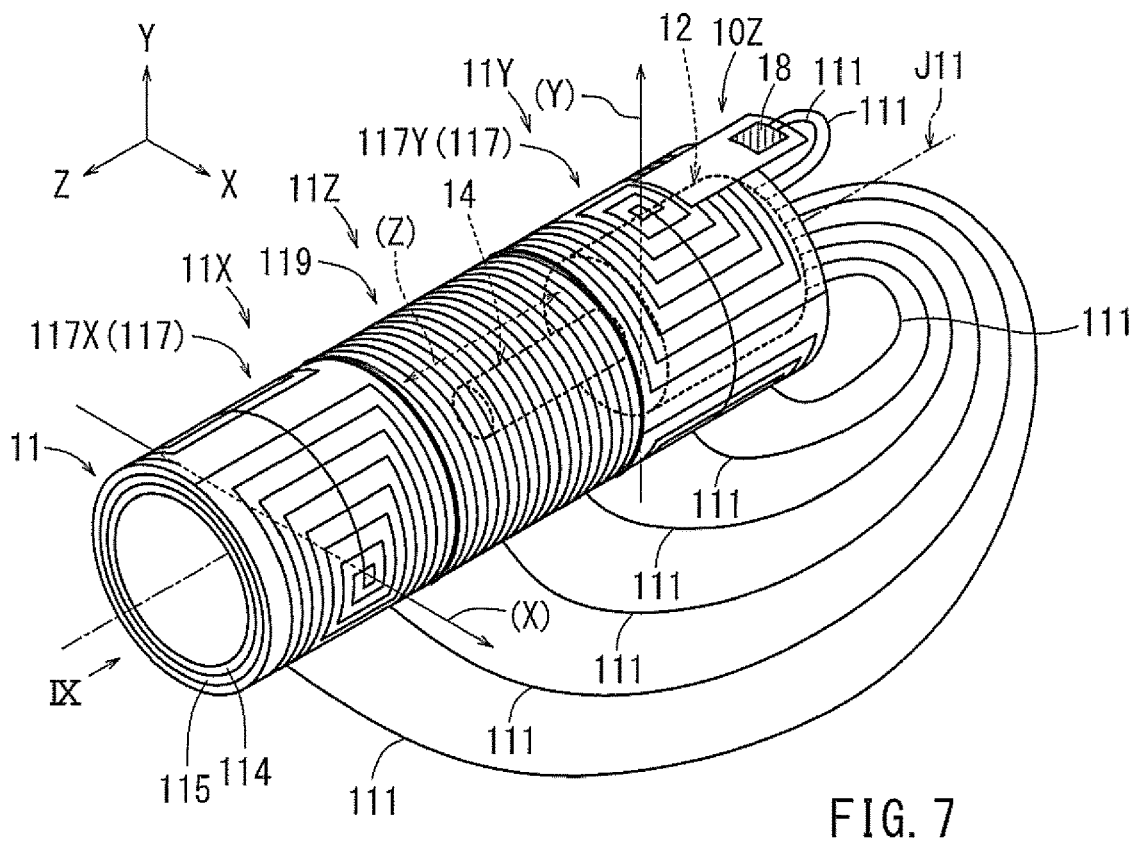
FIG. 7 is a perspective view illustrating an example of an appearance of the wireless detonator in which the detonation side transmitting antenna is provided at an exterior position of the detonation side receiving antenna.
Figure 20:
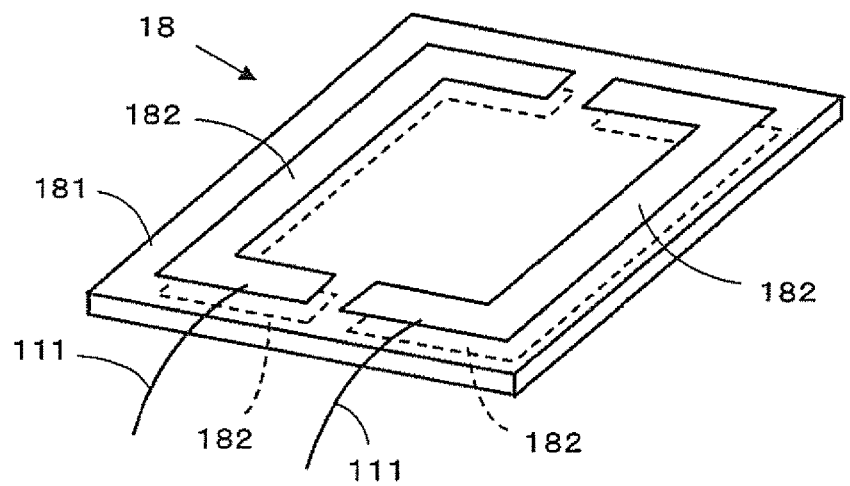
FIG. 20 is a perspective view of an appearance of a detonation side transmitting antenna.

If the response frequency is set to be greater than or equal to 100 MHz and less than or equal to 1 GHz, the response transmission function of the detonation side transmitting antenna 18 can be achieved with an antenna size of about several centimeters, for example, printed on a surface of an electronic circuit board (see FIG. 20). Therefore, with said size, the detonation side transmitting antenna 18 can be provided at a position as illustrated in FIG. 6 or FIG. 7. Thus, the detonation side transmitting antenna 18 can be easily integrated with the wireless detonator. In the example of FIG. 6, the detonation side transmitting antenna 18 is connected to the controller 12 via conductive wires or may be integrally formed with the controller 12 (see FIG. 28). In an example of FIG. 7, the detonation side transmitting antenna 18 is connected with the controller 12 via conductive wires 111.

Figure 9:
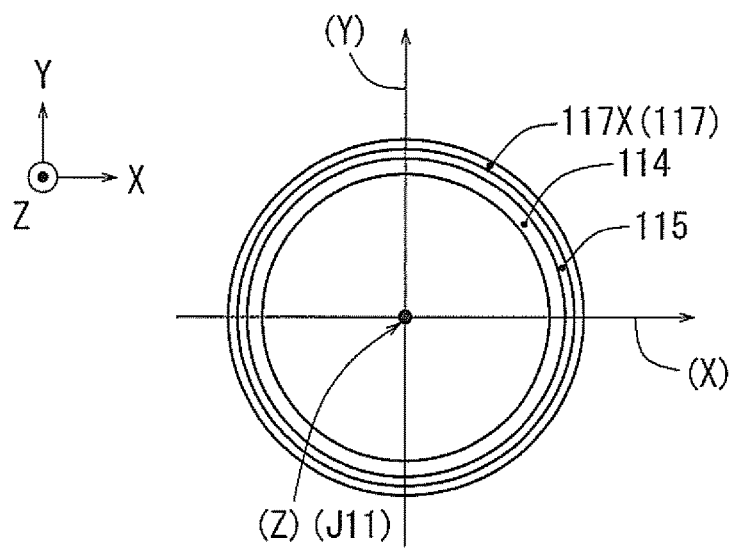
FIG. 9 is a view of the detonation side receiving antenna shown in FIG. 8 as viewed from the Z-axis direction.
Figure 13:
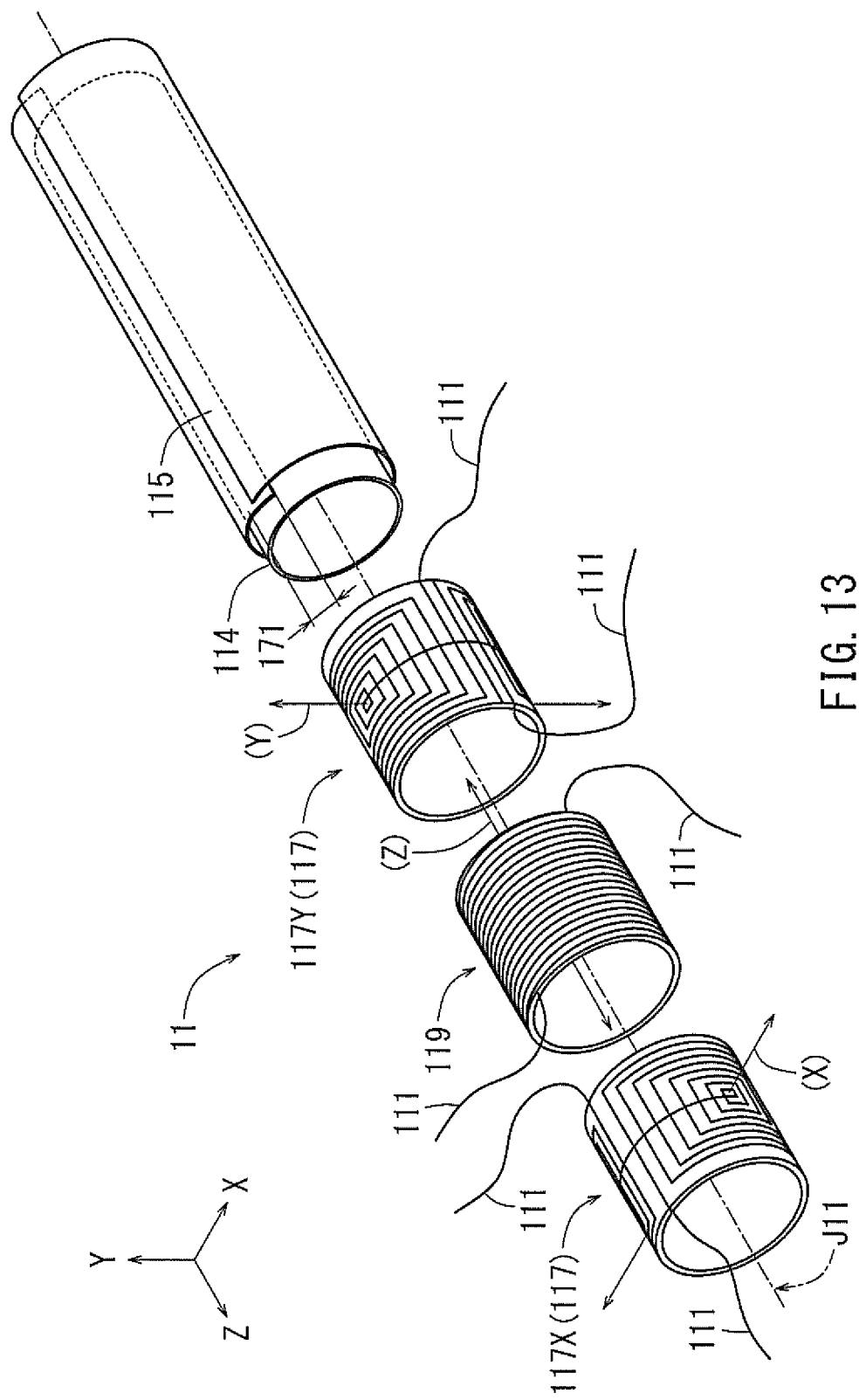
FIG. 13 is an exploded perspective view of a detonation side receiving antenna comprising a base tubular body, a tubular magnetic body, a tubular coil for Z-axis, a sheet-shaped coil for X-axis and a sheet-shaped coil for Y-axis.

The wireless detonator 10 comprises the detonation side receiving antenna 11, the detonation side transmitting antenna 18, the controller 12 and the initiator 14 connected to the controller 12. The controller 12 is connected to the detonation side receiving antenna 11 and the detonation side transmitting antenna 18, and ignites the initiator 14. A detonation side electronic circuit 120 is accommodated in the controller 12 (see FIGS. 11 and 12). FIG. 9 is a view of the detonation side receiving antenna 11 in FIG. 8 as seen from the negative Z IX direction in FIG. 8. In the exploded view of the detonation side receiving antenna 11, as shown in FIG. 13, a base tubular body 114 with a tubular shape (for example, tubular acryl material), tubular magnetic body 115, tubular coil (tubular coil 119 for Z-axis) and sheet-shaped coils 117 are coaxially arranged with each other. The tubular magnetic body 115 is formed of a sheet-shaped magnetic body (for example, ferrite) and has a thin-walled tubular shape. The tubular magnetic body 115 is wound around an outer periphery of the base tubular body 114, such that its circumferential ends overlap around the base tubular body's outer periphery. The tubular coil (119) and the sheet-shaped coils 117 (the sheet-shaped coil 117X oriented in the X-axial direction and the sheet-shaped coil 117Y oriented in the Y-axial direction, as shown in FIG. 13) are sized to fit around the outer periphery of the tubular magnetic body 115, and are stacked to be adjacent side-by-side in the Z-axial direction, as shown in FIG. 8, on the detonation side receiving antenna 11. The detonation side receiving antenna 11 preferably has a thin-walled cylindrical shape. However, it may have any cross-sectional shape orthogonal to the axis direction (Z-axis direction) such as a circular-, eclipse- or polygonal cross-sectional shape, as long as the cross-sectional shape is also thin-walled. The detonation side receiving antenna 11 and the controller 12 are connected via the conductive wires 111.

Figure 10:
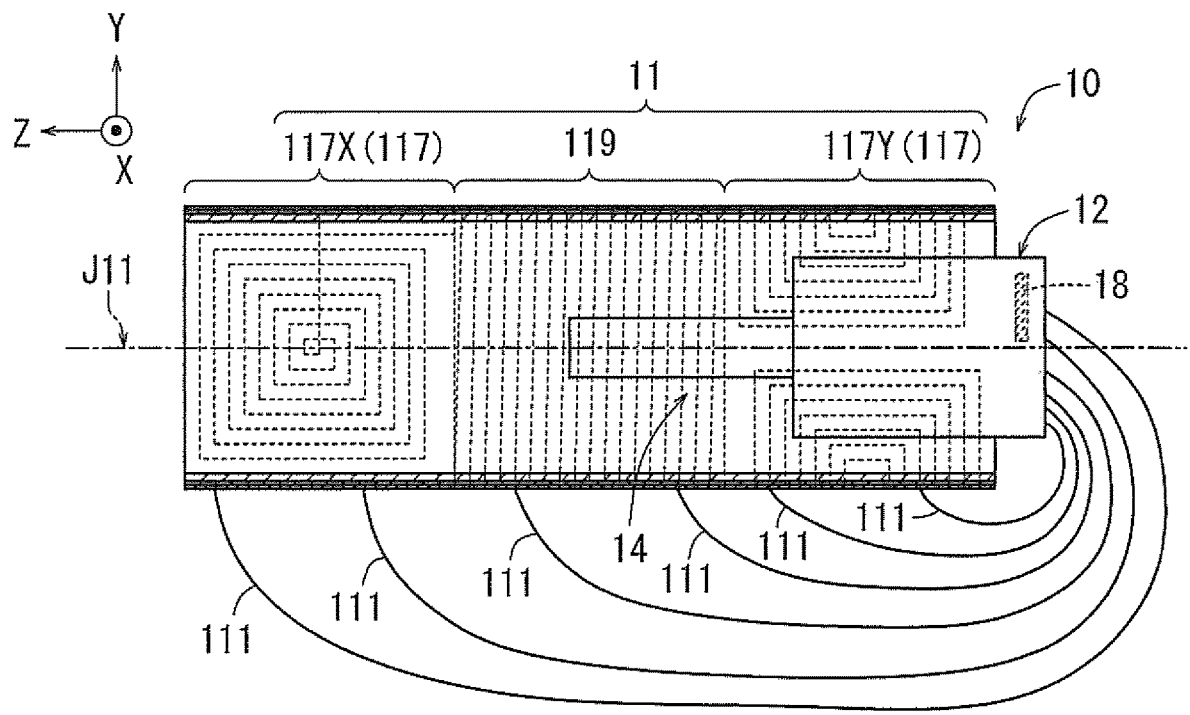
FIG. 10 is a cross-sectional view of the wireless detonator shown in FIG. 6.

FIG. 10 shows a cross sectional view, on the YZ plane, of the wireless detonator 10 shown in FIG. 6. As shown, the initiator 14 is fixed to the controller 12. The controller 12, where the outer circumference of the controller 12 is slightly smaller than the inner circumference of the receiving antenna 11, is snugly fixed into one of the openings of the detonation side receiving antenna 11, in a concentric manner. A part of the controller 12 protrudes outside of the detonation side receiving antenna 11. The detonation side transmitting antenna 18 is provided on the protruding part of the controller 12 and is positioned so as to be spaced apart from, and not in contact with, the detonation side receiving antenna 11. An explosive may preferably be charged in the internal space of the detonation side receiving antenna 11, between the unoccupied opening of the antenna 11, as shown in FIG. 6, and the controller 12 in the Z direction. With such an arrangement, it is possible to improve a crushing effect since the explosive may be arranged in the furthest depth of the blast hole, towards the hole's negative Z end. The initiator 14 is fixed to the controller 12 so as to extend from the controller 12 towards the side of the antenna with the other opening. By inserting the explosive into the detonation side receiving antenna 11 from this other opening, in between the opening and the controller 12 in the Z-direction, the initiator 14 may be inserted into a leading end of the inserted explosive, which jointly forms the primary charge explosive with the wireless detonator.

Figure 11:
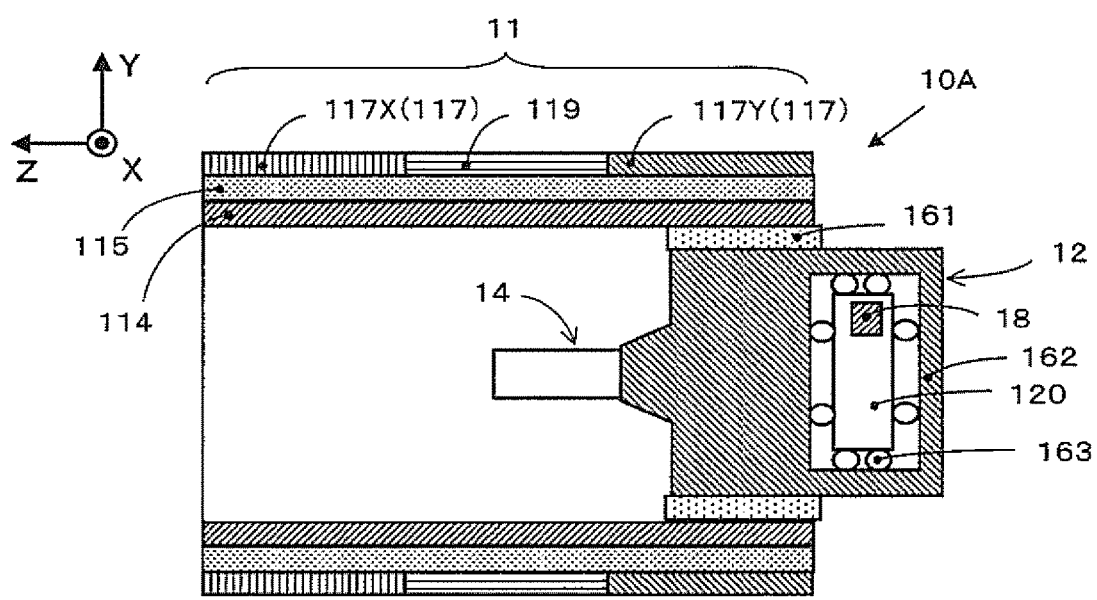
FIG. 11 is a cross-sectional view of an example of a wireless detonator having a different accommodating structure for the controller and the initiator, compared to those of the wireless detonator shown in FIG. 10.

FIG. 11 is a cross-sectional view of a wireless detonator 10A having a different structure from that of in FIG. 10, in which the controller 12 and the initiator 14 are accommodated in the detonation side receiving antenna 11. In the example illustrated in FIG. 11, the detonation side receiving antenna 11, the tubular magnetic body 115 and the base tubular body 114 are concentrically arranged about the Z-axis with respect to each other, where each of them is formed in a tubular shape, adjacent to each other in the radial direction, where the tubular magnetic body 115 has a larger radius than the base tubular body 114. The controller 12 with the initiator 14 fixed at its positive-Z-end, is fitted within the negative-Z-end opening of the detonation side receiving antenna 11 by, for example, an adhesive 161 applied to its circumferential periphery. The controller 12 comprises a control case 162, a detonation side electronic circuit 120 (electronic circuit indicated with a reference numeral 120 in FIG. 27), and a cushioning material 163. The detonation side transmitting antenna 18 is integrated with the detonation side electronic circuit 120 (see a control unit 139 in FIG. 28).

As shown in FIG. 11, a part of the controller 12 protrudes outside of the detonation side receiving antenna 11. The detonation side transmitting antenna 18 is provided on the part of the controller 12 protruding outward in the negative Z direction, and is positioned so as to be spaced apart from and not in contact with the detonation side receiving antenna 11. The initiator 14 is fixed to the controller 12 such that it extends toward the positive Z end opening from the controller 12. By inserting the explosive into the detonation side receiving antenna 11 from this other opening, in between the opening and the controller 12 in the Z-direction, the initiator 14 may be inserted into a leading end of the inserted explosive, which jointly forms the primary charge explosive with the wireless detonator. The control case 162 may be made of material such as resin capable of allowing radio waves to easily pass through while maintaining a relatively high degree of strength. Further, a cushioning material 163 may be provided between the control case 162 and the detonation side electronic circuit 120. Consequently, the shock waves generated when the explosives placed in adjacent blast holes are detonated, may be reduced by the control case 162 and the cushioning material 163 before the shock waves reach the detonation side electronic circuit 120. In this way, the damage of the detonation side electronic circuit 120 by explosions in adjacent blast holes 40 may be prevented.

As shown in FIG. 12, a wireless detonator 10B has a different structure from that of the wireless detonator 10 in FIG. 10 and that of the wireless detonator 10A in FIG. 11. The wireless detonator 10B comprises an initiator 14, extending in the Z direction, from the positive-Z-end of a controller 12, where the initiator 14 is accommodated within the detonation side receiving antenna 11 while the controller 12 is arranged outside of the detonation side receiving antenna 11. The detonation side receiving antenna 11 comprises a tubular magnetic body 115 and a base tubular body 114 which are arranged concentrically about the Z-axis, side-by-side radially, with respect to each other, where the tubular magnetic body 115 has a larger radius than the base tubular body 114. These two components are likewise concentric with respect to, and side-by-side radially, with a tubular protection case 165, which has a larger radius than the tubular magnetic body 115. The protection case 165 comprises a vertical partition wall 166 in the Y-axial-direction configured to isolate the controller 12 from the initiator 14 and the explosive which would be connected to the initiator 14. The controller 12 is positioned on the opposite side of the partition wall 166 with respect to the initiator 14, and is arranged outside of the detonation side receiving antenna 11 but still at least partially within the protection case 165. In particular, the controller 12 may be snugly fitted into and fixed to one of the openings of the protection case 165 (e.g. the negative-Z-end opening formed next to the open end of the partition wall 166 as shown in FIG. 12), or it may be fixed to the opening by an adhesive, etc. The controller 12 may comprise a control case 162, a detonation side electronic circuit 120 and a cushioning material 163 etc. similar to the example of FIG. 11.

Figure 28:
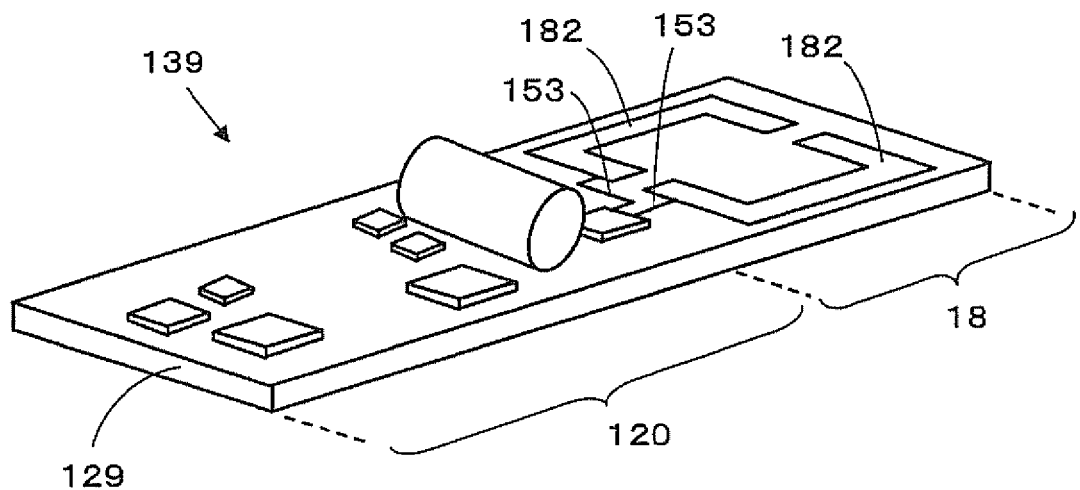
FIG. 28 is a perspective view of an appearance of a control unit with a controller and a detonation side transmitting antenna integrated with each other.

As shown in FIG. 12, the detonation side transmitting antenna 18 is integrated with the detonation side electronic circuit 120 (see control unit 139 in FIG. 28, showing both the circuit 120 and the antenna 18 in greater detail). The controller 12 comprises a projecting portion lying outside of the detonation side receiving antenna 11. The detonation side transmitting antenna 18 is provided on the projecting portion and is positioned so as to be spaced apart from and not in contact with the detonation side receiving antenna 11. Similar to the example of FIG. 11, the initiator 14 may be fixed to the controller 12 such that it extends from the positive-Z-end of the controller 12 toward the opening on the positive-Z-end of the detonation side receiving antenna 11. By inserting the explosive into the detonation side receiving antenna 11 from the positive-Z-end opening of the antenna, in between the opening and the controller 12 in the Z-direction, the initiator 14 may be inserted into a leading end of the inserted explosive, which jointly forms the primary charge explosive with the wireless detonator. The control case 162 may be made of material such as resin capable of allowing the radio waves to easily pass through while maintaining a relatively high degree of strength. Consequently, the impact of shock waves generated when explosives placed in adjacent blast holes are detonated may be reduced by the control case 162 and the cushioning material 163, before the shock waves reach the detonation side electronic circuit 120. As a result, damage to the detonation side electronic circuit 120 may be prevented. A part of the control case 162 may be arranged outside of the detonation side receiving antenna 11. This configuration allows the detonation side electronic circuit 120 to have a size greater than or equal to an inner diameter of the base tubular body 114. As a result, flexibility in size of the detonation side electronic circuit 120 is improved. An area for inserting the explosive may also be increased and the crushing effect generated by discharge of the explosive may thereby be improved.

FIGS. 13 to 20 illustrate a structure of the detonation side receiving antenna 11 and the detonation side transmitting antenna 18. FIG. 13 is an exploded perspective view of the detonation side receiving antenna 11. The detonation side receiving antenna 11 is configured to receive energy for driving the detonation side electronic circuit, control signals and initiation signals in a wireless manner. The detonation side receiving antenna 11 may comprise a base tubular body 114, a tubular magnetic body 115, a sheet-shaped coil 117X oriented in the X-axial direction for signal coverage, a tubular coil 119 oriented in the Z-axial direction for signal coverage, and a sheet-shaped coil 117Y oriented in the Y-axial direction for signal coverage, where all coils are coaxial with respect to the longitudinal Z axis direction being the longitudinal axis at the radial center of said coils. The base tubular body 114 may be omitted.

Figure 14:
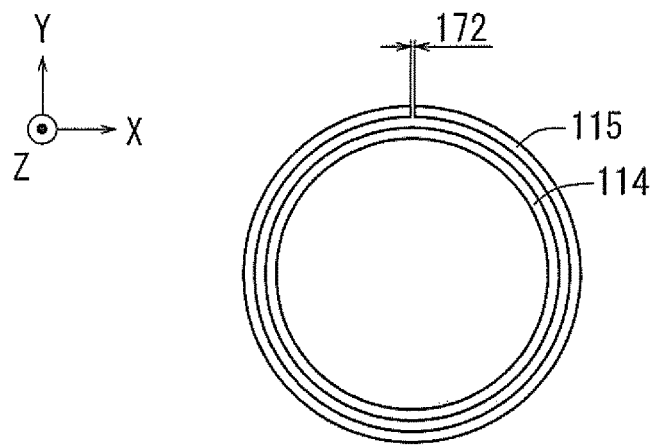
FIG. 14 is a view of a state in which the tubular magnetic body is wound around an outer peripheral surface of the base tubular body in FIG. 13 as viewed from an axis direction of the base tubular body.

The material of the tubular magnetic body 115 may be a material with high magnetic permeability, the magnetic poles of which may be relatively easily eliminated or reversed among magnetic bodies. It may preferably be, for example, iron, silicon steel, permalloy, sendust alloy, permendur, ferrite, an amorphous magnetic alloy, a nanocrystalline magnetic alloy, or the like, and in the present embodiment, ferrite is used. As shown in FIG. 13, the tubular magnetic body 115 is formed to have a rolled sheet shape, and may be wound around the outer peripheral surface of the base tubular body 114 to form a thin wall tube, where its circumferential sheet ends touch each other in the circumferential direction about the base tubular body 114. As shown in FIG. 14, ends of the tubular magnetic body 115 are preferably wound such that the gap 172 between them is substantially zero without overlapping. However, as shown in FIG. 13, they can also be wound such that the circumferential ends overlap, where one circumferential sheet end of the winding tubular magnetic body 115 is overlapped with the other end to form the overlapped portion 171. Alternatively, the tubular magnetic body 115 may be wound around the tubular body 114 to significantly overlap to form double or triple layers. The gap 172 shown in FIG. 14 is deemed within an allowable range if it is a small gap of, for example, about 1 mm, however, it is not favorable if the gap 172 is larger than the predetermined distance of the small gap. As shown in FIGS. 8 and 13, an antenna axis J11 as a longitudinal axis at the radial center of the tubular magnetic body 115 is parallel to the Z-axis or may be designated as the Z-axis itself.

As shown in FIG. 13, the tubular coil 119 oriented for Z-axial direction signal coverage, the sheet-shaped coil 117X oriented for X-axial direction signal coverage and the sheet-shaped coil 117Y oriented for Y-axial direction signal coverage may be snugly fit on the tubular magnetic body 115 so as to be concentric with respect to the base tubular body 114 and the tubular magnetic body 115 about the J11 axial direction, where the coils may lie side-by-side radially with the tubular magnetic body 115, where the radius of the coils may be only slightly larger than that of the tubular magnetic body 115. In this way, the assembly of the detonation side receiving antenna 11 is completed. The detonation side receiving antenna 11 is charged into the blast hole such that the longitudinal antenna axis J11, which is the axis at the radial center of the detonation side receiving antenna 11, coincides with the longitudinal axial direction of the blast hole 40 (in this case, the Z-axis direction). As for the magnetic field having a component in the Z-axis direction in FIG. 5, the tubular coil 119 oriented for Z-axial direction signal coverage, in which an axis of the winding of the conductive wire extends in the Z-axis direction, and the tubular antenna for Z-axial direction made of tubular magnetic body collectively comprising both the tubular coil 119 and the tubular magnetic body 115 (receiving antenna 11Z for Z-axis (see FIGS. 6 and 7)) can receive efficiently the energy for driving the detonation side electronic circuit, the wireless control signals as well as the initiation signals. As for the magnetic field having a component in the X-axis direction in FIG. 5, the sheet-shaped coil 117X oriented for X-axial direction signal coverage in which an axis of the winding of the conductive wire extends in the X-axial direction, and the sheet-shaped antenna for X-axial direction made of tubular magnetic body collectively including both the sheet-shaped coil 117X and the tubular magnetic body 115 (receiving antenna 11X for X-axis (see FIGS. 6 and 7)) can receive efficiently the energy for driving the detonation side electronic circuit, the wireless control signals as well as the initiation signals. As for the magnetic field having a component in the Y-axis direction in FIG. 5, the sheet-shaped coil 117Y oriented for Y-axial direction signal coverage in which an axis of the winding of the conductive wire extends in the Y-axial direction, and the sheet-shaped antenna for Y-axial direction made of tubular magnetic body collectively including both the sheet-shaped coil 117Y and the tubular magnetic body 115 (receiving antenna 11Y for Y-axis (see FIGS. 6 and 7)) can receive efficiently the energy for driving the detonation side electronic circuit, the wireless control signals as well as the initiation signals. The detonation side receiving antenna 11 in FIG. 13 comprises the base tubular body 114, the tubular magnetic body 115, the tubular coil 119 for Z-axis, the sheet-shaped coil 117X for X-axis, and the sheet-shaped coil 117Y for Y-axis. However, the detonation side receiving antenna 11 may or may not include the base tubular body 114.

As shown in FIGS. 6 and 7, the three antennas formed, in particular the receiving antenna 11Z for Z-axis, the receiving antenna 11X for X-axis and the receiving antenna 11Y for Y-axis, may be fitted onto the tubular magnetic body 115, such that they are arranged side-by-side in any order along the Z-axis direction so as to not overlap. The receiving antenna 11Z for Z-axis comprises the tubular coil 119 oriented for Z-axial direction signal coverage as well as the tubular magnetic body 115 (corresponding to the first magnetic body). The receiving antenna 11X for the X-axis comprises the sheet-shaped coil 117X oriented for X-axial direction signal coverage as well as the tubular magnetic body 115 (corresponding to the second magnetic body). The receiving antenna 11Y for the Y-axis comprises the sheet-shaped coil 117Y oriented for Y-axial direction signal coverage as well as the tubular magnetic body 115 (corresponding to the third magnetic body). The first magnetic body, the second magnetic body and the third magnetic body may be separately configured or may also be configured as a common collective assembled magnetic body as shown in the present exemplary embodiment.

Figure 15:
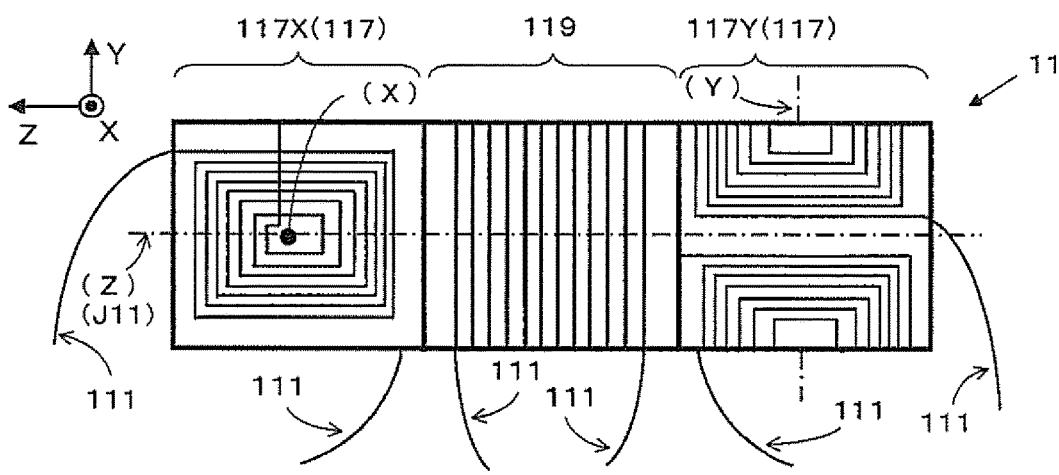
FIG. 15 is a view illustrating an example of an appearance of a detonation side receiving antenna with the tubular coil for Z-axis arranged in the center.
Figure 16:
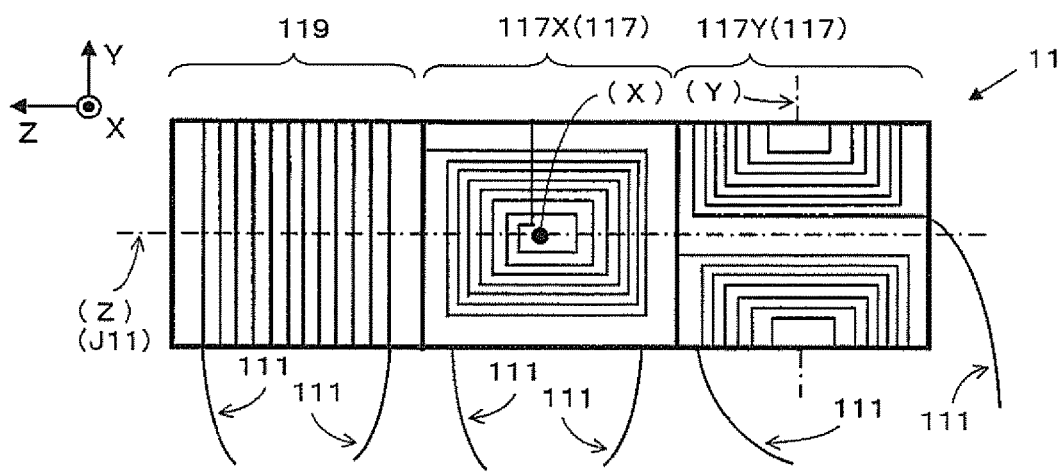
FIG. 16 is a view illustrating an appearance of a detonation side receiving antenna with the tubular coil for Z-axis arranged at the end (left end in FIG. 16).

According to various experimental results carried out by the inventors, the tubular coil 119 for Z-axis is preferably arranged in the center. Namely, the tubular coil for Z-axis is preferably arranged between the sheet-shaped coil for X-axis and the sheet-like coil for Y-axis along the Z direction. For example, as shown in FIG. 15, the coils are arranged in such an order that the sheet-shaped coil 117X for X-axis is located on the left side, the tubular coil 119 for Z-axis is in the center, the sheet-shaped coil 117Y for Y-axis is on the right side, from the positive-Z-end to the negative-Z-end of the tubular magnetic body 115. This arrangement will be described as (117X, 119, 117Y). The arrangements with the tubular coil 119 for Z-axis in the center comprise arrangements in the order of (117X, 119, 117Y) shown in FIG. 15 and in the order of (117Y, 119, 117X) where the configuration is pivoted about the Z-axis by 90 degrees from the state shown in FIG. 15. The arrangement with the tubular coil 119 for Z-axis on the left end in the order of (119, 117X, 117Y) as shown in FIG. 16, the arrangement in the order of (119, 117Y, 117X) (not shown), and the arrangement with the tubular coil 119 for Z-axis on the right end in the order of (117X, 117Y, 119) or (117Y, 117X, 119) are also possible.

Figure 17:
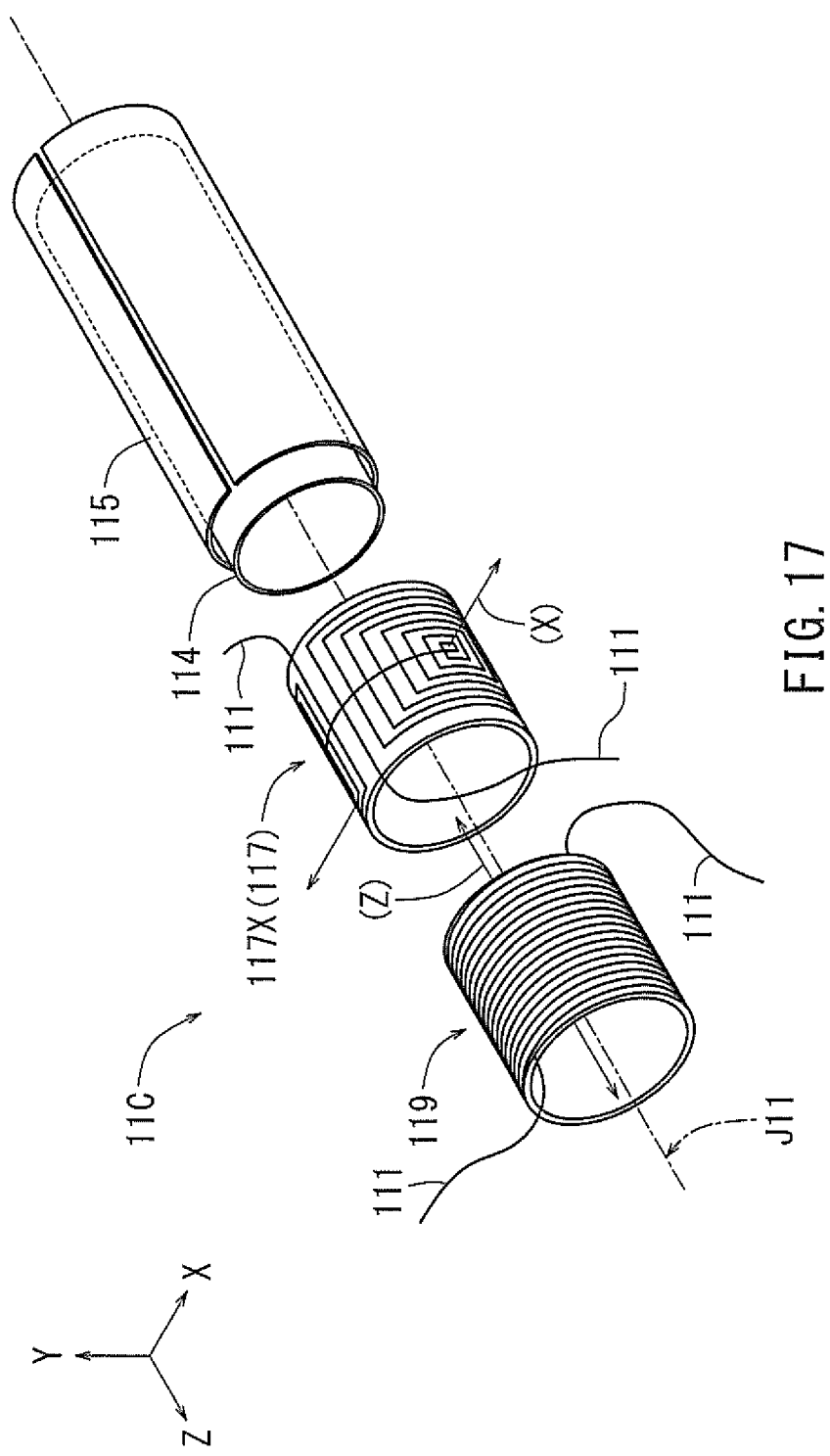
FIG. 17 is an exploded perspective view of a detonation side receiving antenna comprising the base tubular body, the tubular magnetic body, the tubular coil for Z-axis and the sheet-shaped coil for X-axis.
Figure 18:
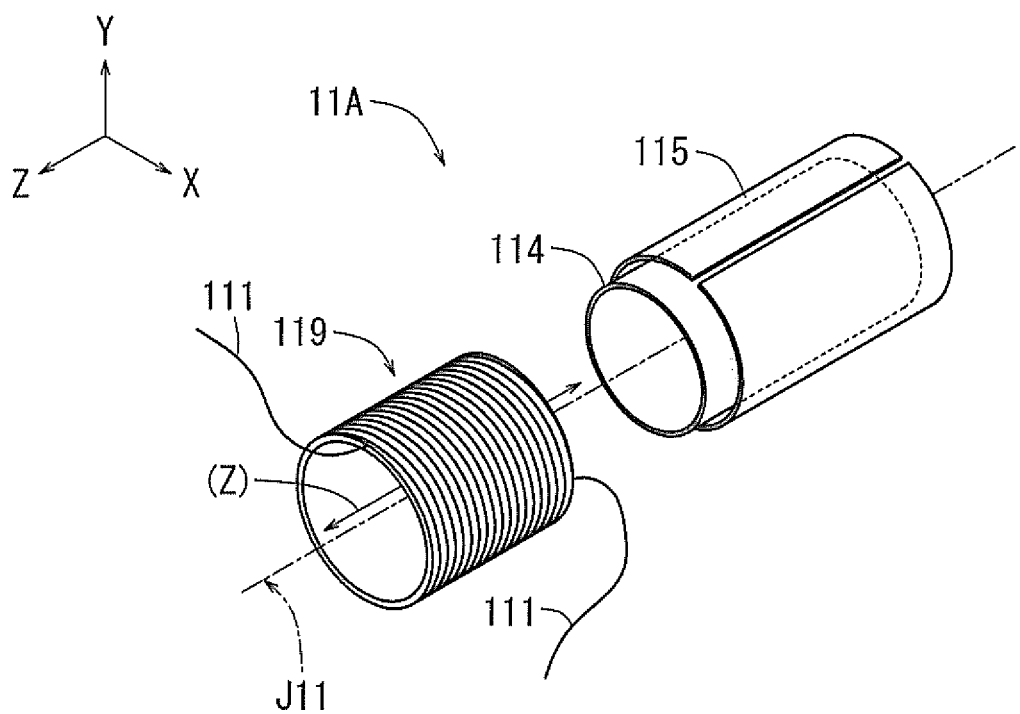
FIG. 18 is an exploded perspective view of a detonation side receiving antenna comprising the base tubular body, the tubular magnetic body and the tubular coil for Z-axis.
Figure 19:
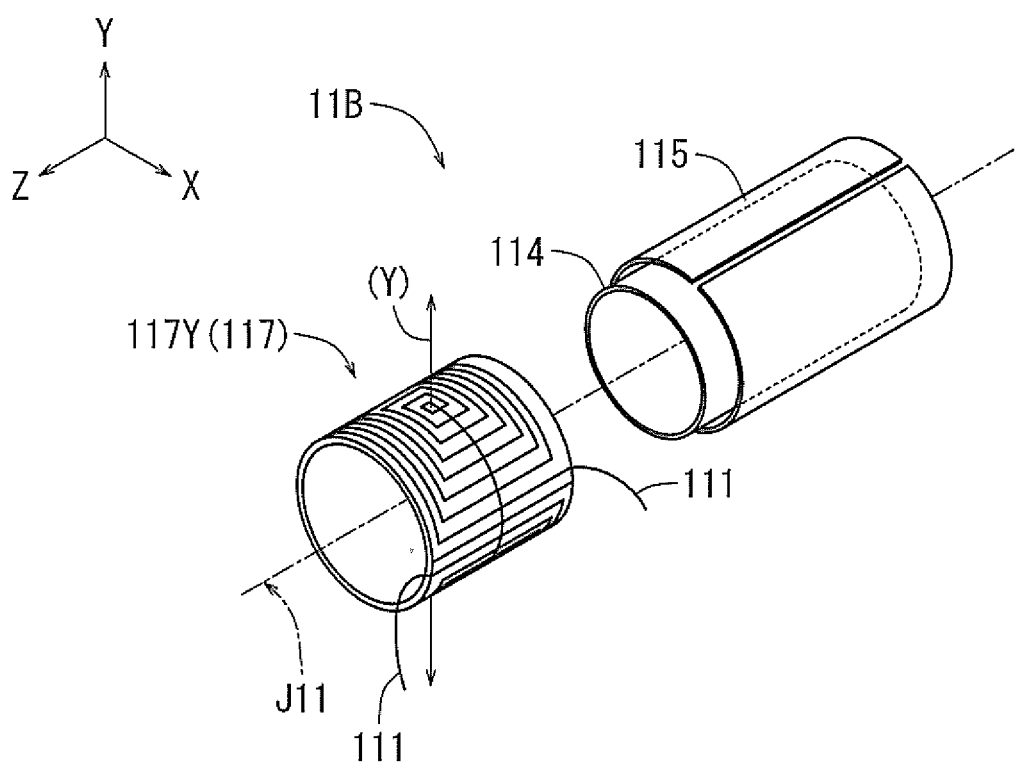
FIG. 19 is an exploded perspective view of a detonation side receiving antenna comprising the base tubular body, the tubular magnetic body and the sheet-shaped coil for Y-axis.

The detonation side receiving antenna 11 may be composed of three coils including the tubular coil 119 for Z-axial direction signal coverage (tubular coil), the sheet-shaped coil 117X for X-axial direction signal coverage (sheet-shaped coil) and the sheet-shaped coil 117Y for Y-axial direction signal coverage (sheet-shaped coil), as well as the tubular magnetic body 115. Alternatively, the detonation side receiving antenna 11 may be composed of at least one of or a sub combination of the tubular coils or the sheet-shaped coils, and the tubular magnetic body. As shown in FIG. 17, in this case, the detonation side receiving antenna 11C may be installed in the charge position P2c shown in FIG. 5, wherein the receiving antenna 11C is composed of the tubular coil 119 for Z-axial direction coverage, the sheet-shaped coil 117X for X-axial direction coverage, the base tubular body 114 and the tubular magnetic body 115. The base tubular body 114 may be omitted if desired. As shown in FIG. 18, the detonation side receiving antenna 11A may be installed in the charge position P2b shown in FIG. 5, wherein the receiving antenna 11A is composed of the tubular coil 119 for Z-axial direction signal coverage, the base tubular body 114 and the tubular magnetic body 115. The base tubular body 114 may be omitted if desired. As shown in FIG. 19, the detonation side receiving antenna 11B may be installed in the charge position P1b shown in FIG. 5, wherein the receiving antenna 11B is composed of the sheet-shaped coil 117Y for Y-axial direction signal coverage, the base tubular body 114 and the tubular magnetic body 115. The base tubular body 114 may be omitted. In other words, in accordance with the positions of the charge holes, and corresponding signal coverage needed as depicted in FIG. 5, the antenna having an axis in the direction or directions coinciding to the great(est) component(s) of the magnetic field at that position can be provided. In this case, the axis of the wound conductive wire for the antenna oriented for signal coverage in a certain axial direction preferably coincides with the direction of the magnetic field at that position without being limited to the X-axis, Y-axis, and Z-axis.

As shown in FIG. 17, the detonation side receiving antenna may be composed of the sheet-shaped coil 117X for X-axial direction, the base tubular body 114 and the tubular magnetic body 115. The base tubular body 114 may be omitted if desired. As shown in FIG. 17, the tubular coil 119 for Z-axial direction signal coverage and the sheet-shaped coil 117X for X-axial direction signal coverage may collectively be replaced by the tubular coil 119 for Z-axis and the sheet-shaped coil 117Y for Y-axis. Alternatively, they also may be replaced with the sheet-shaped coil 117X for X-axis and the sheet-shaped coil 117Y for Y-axis. In this way, various detonation side receiving antennas may be selected per the positions of the blast holes in the blasting face, and applicable magnitudes of electric fields at these holes. As a result, it is possible to achieve the assembly of the appropriate detonation side receiving antenna capable of receiving the energy for driving the detonation side electronic circuit as well as the wireless control signals and the initiation signals more efficiently in each of the blast holes drilled in the blasting face.

Hereinafter, the structure of the detonation side transmitting antenna 18 will be described with reference to FIG. 20. The detonation side transmitting antenna 18 is set to have a response frequency of greater than or equal to 100 MHz and less than or equal to 1 GHz such that it is not necessary to deliver the energy for driving the detonation side electronic circuit. The detonation side transmitting antenna 18 only needs to transmit the response signals to the blasting controller 50. Therefore, it may have a size of about several centimeters and requires no magnetic body. The detonation side transmitting antenna 18 may comprise a base portion 181 which is a flat square-like sheet or flat plate-like member of an insulator, an antenna portion 182 of a conductor printed on a surface of the base portion 181 and the conductive wires 111 for connecting the antenna portion 182 with the controller. As shown in FIG. 28, when the detonation side electronic circuit 120 and the detonation side transmitting antenna 18 are integrally formed with respect to each other, the antenna portion 182 may be printed on the electronic circuit board itself, so that the antenna portion 182 can be connected to the detonation side electronic circuit 120 by a wiring pattern 153 on the electronic circuit board. The conductive wires 111 (see FIG. 20) for connecting the antenna portion 182 with the detonation side electronic circuit 120 is replaced by the wiring pattern 153 already present on the board, in the example illustrated in FIG. 28. The antenna portion 182 in FIG. 20 is configured in the form of a pair of U-shapes rotated 90 degrees and facing opposite each other. However, the configuration of the antenna portion 182 is not specifically limited, and may take the forms of various other shapes/arrangements as well. In the example illustrated in FIG. 20, the antenna portion 182 is provided on a front surface and a rear surface of the base portion 181. However, other configurations are possible, where the antenna portion 182 may be provided on at least one of the front or rear sides of the base portion 181.

Figure 21:
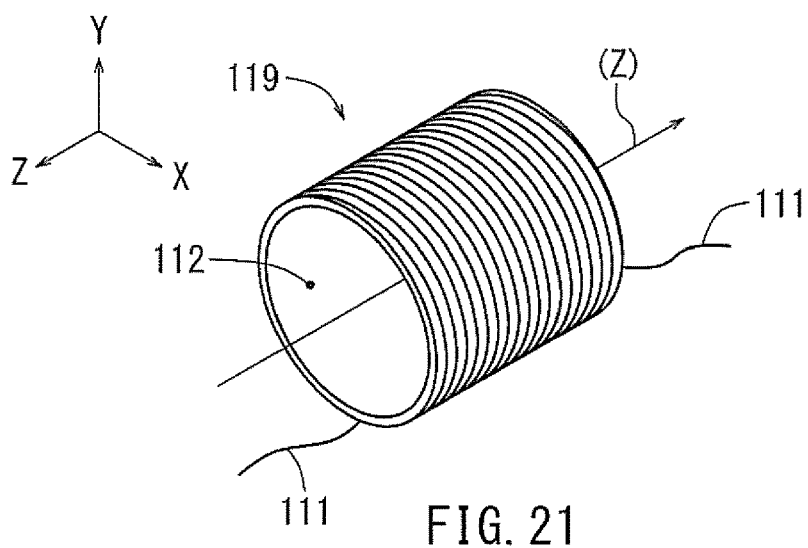
FIG. 21 is a perspective view of the tubular coil for the Z-axis with a conductive wire wound around the Z-axis.

In FIGS. 21 to 26, structures of the tubular coil 119 for Z-axis, the sheet-shaped coil 117X for X-axis and the sheet-shaped coil 117Y for Y-axis are illustrated. In the following description for each of the coils, the axis coinciding with the longitudinal axis at the radial center of the tubular magnetic body will be described as a Z-axis, an axis orthogonal to the Z-axis will be described as an X-axis and the axis orthogonal to both the Z- and X-axis will be described as Y-axis. An example of an appearance of the tubular coil 119 for Z-axial direction signal coverage will be illustrated in FIG. 21. The tubular coil 119 for Z-axial direction signal coverage is a tubular coil formed to have a tubular shape with the conductive wire 111 wound around the Z-axis. The tubular coil in FIG. 21 is formed by winding the conductive wire 111 on the tubular body 112. Alternatively, the tubular coil may be formed by winding the conductive wire 111 without providing the tubular body 112. From the condition illustrated in the exploded perspective view in FIG. 18, the tubular coil 119 for the Z-axis (corresponding to the tubular coil) is provided such that it fits around the outer peripheral surface of the tubular magnetic body 115 such that it will be concentric along with the tubular magnetic body 115 with respect to the Z-axis, where the tubular magnetic body 115 is formed in a thin-wall tubular shape with the Z-axial direction parallel to its radial center. In this way, the tubular detonation side receiving antenna 11A (tubular antenna for Z-axial direction (receiving antenna for Z-axial direction)) may be configured in its entirety.

Figure 22:
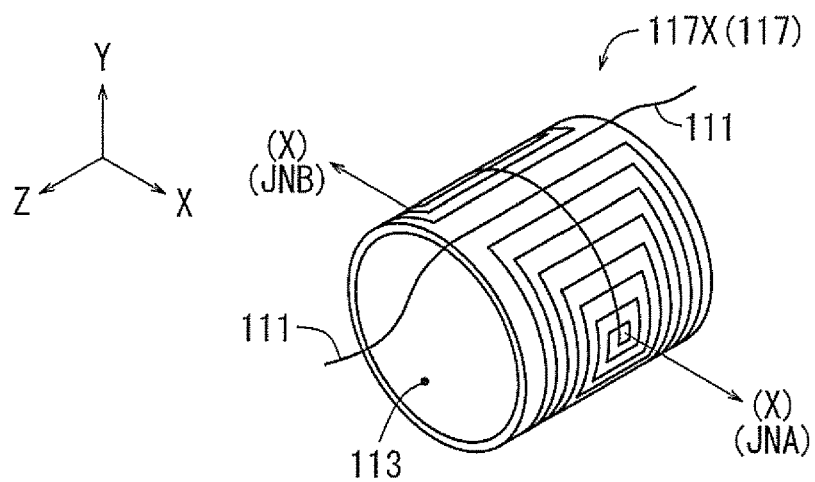
FIG. 22 is a perspective view of a sheet-shaped coil for X-axis with a conductive wire wound around the X axis wherein the conductive wire is wound around an axis that is orthogonal to an axis of the tubular magnetic body.
Figure 24:
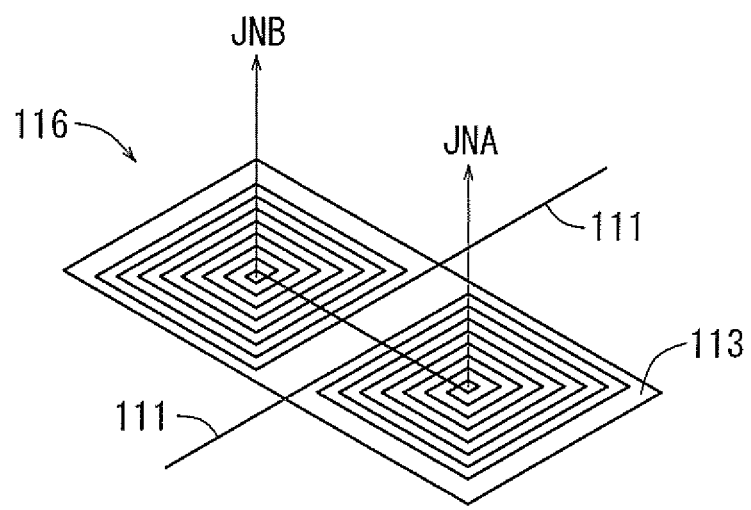
FIG. 24 is a perspective view of a sheet-shaped coil with a conductive wire wound around each of two virtual axes.

FIG. 22 illustrates an example of an appearance of the sheet-shaped coil 117X for X-axial direction signal coverage. According to the sheet-shaped coil 117X oriented for X-axial direction signal coverage, the conductive wire 111 is wound around each of the parallel virtual axes JNA and JNB as shown in FIG. 24. A sheet-shaped coil 116 is formed, wherein the sheet is orthogonal to each of the virtual axes JNA and JNB. As shown in FIG. 22, the sheet-shaped coil can be formed in that the sheet is rolled into a tubular shape such that the virtual axes JNA and JNB will be coaxial. The sheet-shaped coil 117X for X-axial direction signal coverage is bent such that the virtual axes JNA and JNB (see FIG. 24) will be coaxial along a line parallel to the X-axis as shown in FIG. 22. The coaxial virtual axes JNA and JNB are arranged in parallel to the X-axis. Specifically, the sheet-shaped coil 117X for X-axis comprises the conductive wire 111 wound around the X-axis.

Figure 25:
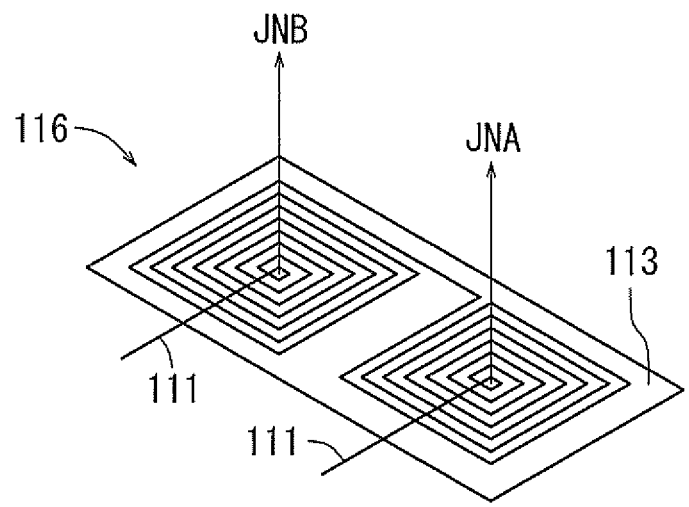
FIG. 25 is a perspective view of the sheet-shaped coil with a conductive wire wound around each of two virtual axes.
Figure 26:
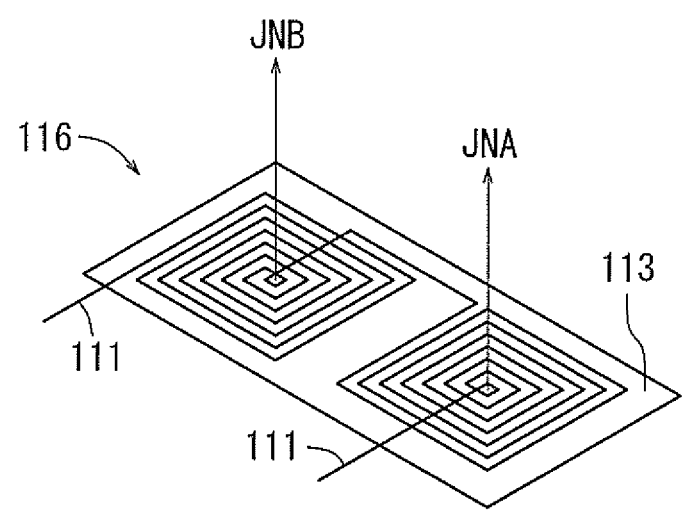
FIG. 26 is a perspective view of the sheet-shaped coil with a conductive wire wound around each of two virtual axes.

As shown in FIG. 24, a coil may be formed in a sheet-shape by winding the conductive wire 111 on a sheet 113. Alternatively, the conductive wire 111 may be wound without providing the sheet 113 so as to form a sheet-shaped coil by the conductive wire 111. The sheet-shaped coil 117X for X-axial direction signal coverage (see FIG. 17) may be formed in a tubular shape by bending the sheet-shaped coil along the outer peripheral surface of the tubular magnetic body 115 as shown in FIG. 17. The sheet-shaped coil 117X for X-axial direction signal coverage may be then provided around the outer peripheral surface of the tubular magnetic body 115, which is formed in a thin-wall tubular shape. In this way, the detonation side receiving antenna (sheet-shaped antenna for X-axial direction signal coverage (receiving antenna for X-axial direction)) may be configured. At this time, as for the sheet-shaped coil oriented for X-axial direction signal coverage, the conductive wire is wound around an axis (in this case, X-axis) orthogonal to an axis (Z-axis) of the tubular magnetic body 115. As shown in FIG. 24, the conductive wire 111 may be wound around each of the virtual axes JNA and JNB on the sheet 113. Alternatively, as shown in FIGS. 25 and 26, the conductive wire 111 may be wound around each of the virtual axes JNA and JNB on the sheet 113 in a different winding configuration.

Figure 23:
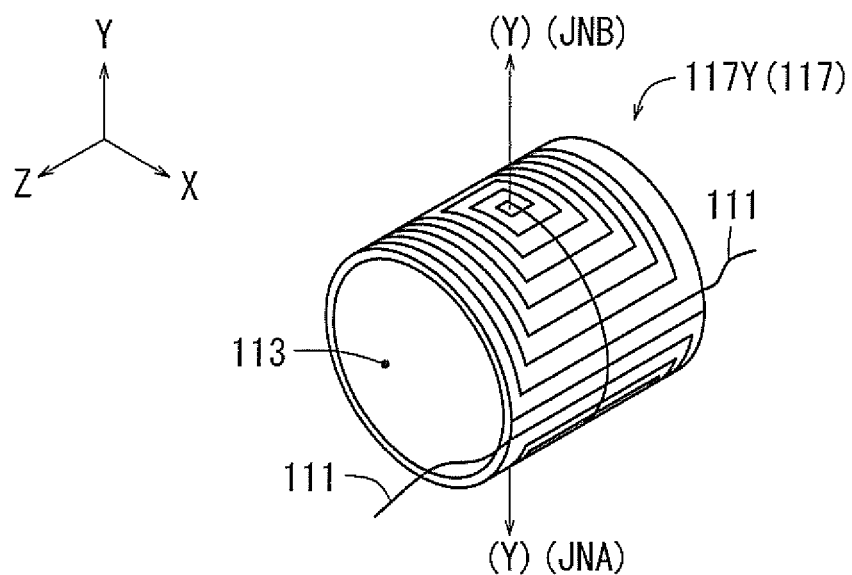
FIG. 23 is a perspective view of a sheet-shaped coil for Y-axis with a conductive wire wound around the Y-axis wherein the conductive wire is wound around an axis that is orthogonal to an axis of the tubular magnetic body.

FIG. 23 illustrates an example of an appearance of the sheet-shaped coil 117Y for Y-axial direction signal coverage. As shown in FIG. 24, in the sheet-shaped coil 117Y oriented for Y-axial direction signal coverage, the conductive wire 11 is wound around each of the parallel virtual axes JNA and JNB. The coil 117Y is formed as a coil 116 in a sheet-shape orthogonal to each of the virtual axes JNA and JNB. As shown in FIG. 23, it is formed in a tubular-shape such that the virtual axes JNA and JNB are coaxial along an axis parallel to the Y axis. As shown in FIG. 23, the sheet-shaped coil 117Y for Y-axis is bent such that the virtual axes JNA and JNB (see FIG. 24) are coaxial and the coaxial virtual axes JNA and JNB lie on an axis in parallel with the Y-axis. More specifically, the sheet-shaped coil 117Y for Y-axis is a sheet-shaped coil with the conductive wire 111 wound around the Y-axis. As shown in FIG. 24, the coil may be made to have a sheet-shape by winding the conductive wire 111 on the sheet 113. Alternatively, the conductive wire 111 may be wound without providing the sheet 113 to form a sheet-shaped coil by the conductive wire 111. The sheet-shaped coil for Y-axial direction signal coverage (corresponding to sheet-shaped coil) may be bent around the outer peripheral surface of the tubular magnetic body 115 as shown in FIG. 19 so as to be provided on the outer peripheral surface of the tubular magnetic body 115. In this way, the tubular detonation side receiving antenna (sheet-shaped antenna oriented for Y-axial direction signal coverage (receiving antenna for Y-axial direction)) can be configured in its entirety. The sheet-shaped foil for Y-axis comprises a conductive wire wound around the axis (in this case, Y-axis) orthogonal to the axis (Z-axis) of the tubular magnetic body 115. The conductive wire may be wound around each of the virtual axes JNA and JNB on the sheet 113 as shown in FIG. 24. Alternatively, the conductive wire 11 may be wound around each of the virtual axes JNA and JNB on the sheet 113 in alternate winding configurations as shown in FIG. 25 and FIG. 26.

The sheet-shaped coil 117Y oriented for Y-axial direction signal coverage may be obtained by pivoting the sheet-shaped coil 117X oriented for X-axial direction signal coverage about the Z-axis by 90 degrees. The energy for driving the detonation side electronic circuit, the control signals and the initiation signals may be more efficiently received when each of the tubular coil 119 for Z-axis, the sheet-shaped coil 117X for X-axis and the sheet-shaped coil 117Y for Y-axis is provided at an outer peripheral surface of the tubular magnetic body 115 than when provided at an inner peripheral surface of the tubular magnetic body 115. As shown in FIGS. 22 and 23 etc., according to the description for the present exemplary embodiment, the conductive wire 111 in the sheet-shaped coil 117X for X-axis and the sheet-shaped coil 117Y for Y-axis is wound in a rectangular shape. However, the winding shape is not limited to a rectangular shape but the conductive wire 111 may also be wound in a helical shape (spiral shape) or in various polygonal shapes. Further, it may also be possible to wind the conductive wire 111 in a combination of the various shapes. Furthermore, the tubular coil oriented for Z-axial direction signal coverage, the sheet-shaped coil oriented for X-axial direction signal coverage, and the sheet-shaped coil oriented for Y-axial direction signal coverage may be made by a worker by manually winding the conductive wire 111 for a predetermined number of times according to the aforementioned patterns.

Figure 27:
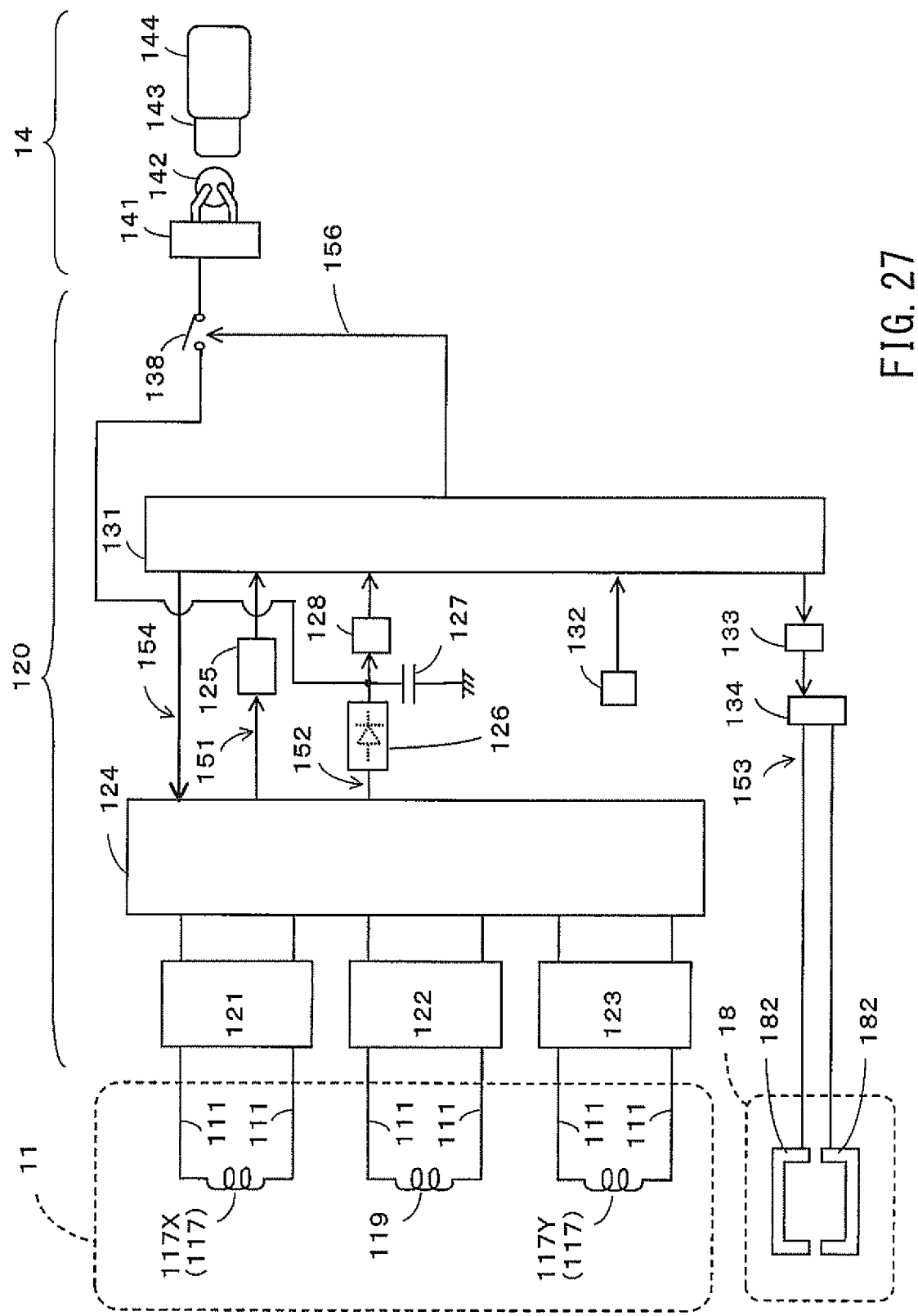
FIG. 27 is a circuit block diagram for the wireless detonator.

Circuits within the controller 12 and the initiator 14 of the wireless detonator 10 (detonation side electronic circuit 120 and the circuit for the initiator 14) will be described with reference to a circuit block diagram shown in FIG. 27. FIG. 27 shows each of the circuits (block diagram) for the detonation side electronic circuit 120 accommodated within the controller 12 and for the initiator 14, and FIG. 27 also comprises the detonation side receiving antenna 11 and the detonation side transmitting antenna 18 shown in FIG. 8.

The detonation side receiving antenna 11 is comprised of a sheet-shaped antenna for X-axial direction signal coverage (receiving antenna for X-axial direction) made of a sheet-shaped coil 117X oriented for X-axial direction signal coverage circumferentially overlaid on the periphery of a tubular magnetic body, a tubular antenna for Z-axial direction signal coverage (receiving antenna for Z-axial direction) made of a tubular coil 119 oriented for Z-axial direction signal coverage circumferentially overlaid on the periphery of a tubular magnetic body, and a sheet-shaped antenna for Y-axial direction signal coverage (receiving antenna for Y-axial direction) made of a sheet-shaped coil 117Y oriented for Y-axial direction signal coverage circumferentially overlaid on the periphery of a tubular magnetic body. The sheet-shaped coil 117X is connected to the three-axis synthetic circuit 124 via a tuning circuit 121 composed of a variable capacitor or the like. Similarly, the tubular coil 119 is connected to the three-axis synthetic circuit 124 via the tuning circuit 122 composed of a variable capacitor or the like. Similarly, the sheet-shaped coil 117Y is also connected to the three-axis synthetic circuit 124 via a tuning circuit 123 composed of a variable capacitor or the like. In this way, the sheet-shaped coil 117X, the tubular coil 119, and the sheet-shaped coil 117Y are all respectively connected to the tuning circuits 121, 122 and 123, respectively via the conductive wires 111. Further, each of the tuning circuits 121, 122 and 123 are connected to the three-axis synthetic circuit 124.

A detonation side transmitting antenna 18 is composed of an antenna portion 182 with a printed conductor. The antenna portion 182 is connected to a transmission circuit 134 via a wiring pattern 153 printed on the same board as the conductor itself, or via conductive wire. When a CPU 131 transmits response signals, the response signals from the CPU are transmitted from the detonation side transmitting antenna 18 through a modulation circuit 133 and the transmission circuit 134 via said wiring pattern 153, or via conductive wire.

The detonation side electronic circuit 120 may comprise the tuning circuits 121, 122 and 123, the three-axis synthetic circuit 124, the CPU 131, a detection-demodulation circuit 125, a regulator 128, the modulation circuit 133, the transmission circuit 134, an ID memory device 132, a power storage device 127 for driving the electronic circuit, a switch circuit 138 for ignition, and a rectification circuit 126, etc. Each of the tuning circuits 121, 122 and 123 may comprise a variable capacitor for regulating a resonance frequency of the respective corresponding sheet-shaped coil 117X, the tubular coil 119, and the sheet-shaped coil 117Y, respectively.

The three-axis synthetic circuit 124 combines energy for driving the detonation side electronic circuit, control signals and initiation signals that are input from the sheet-shaped antenna for X-axial direction (sheet-shaped coil 117X oriented for X-axial direction signal coverage constituting the receiving antenna for X-axial direction), the sheet-shaped antenna for Y-axial direction (sheet-shaped coil 117Y oriented for Y-axial direction signal coverage constituting the receiving antenna for Y-axial direction), and the tubular antenna for Z-axial direction (tubular coil 119 for Z-axial direction signal coverage constituting the receiving antenna for Z-axial direction) via the tuning circuits 121, 122 and 123, and in turn outputs them to paths 151 and 152. The path 151 is a route for introducing the received control signals and the initiation signals. The path 152 is a route for the received energy to be rectified, stored and converted to a constant voltage. The wireless control signals (including signals corresponding to the ID request signals and electronic circuit preparation start signals, and including the initiation execution signals) that are received via the path 151 and the detection-demodulation circuit 125, are introduced into the CPU 131. The energy for driving the detonation side electronic circuit via the path 152 as well as the regulator 128 (constant voltage circuit) may be used as a power source for an electronic circuit such as the CPU and the energy may be stored in the power storage device 127 for driving the electronic circuit.

Identification information specific to the wireless detonator 10 is stored in the ID memory device 132. The CPU 131 transmits the response signals including the identification information read out of the ID memory device 132 upon receiving the ID request signals (control signals). Here, an example was described in which the ID memory device 132 is separately formed from the CPU 131. However, it is not limited to this configuration, and the ID storage device 132 may also be built-in to the CPU 131.

When the CPU 131 receives the initiation execution signal (initiation signal), the CPU 131 controls the switch circuit 138 for initiation from an opened state to a short circuited state by using the control signals 156 such that the energy stored in the power storage device 127 for driving the electronic circuit (energy for driving the detonation side electronic circuit) may be output to the ignition circuit 141 so as to execute the detonation.

The initiator 14 may comprise the ignition circuit 141, a fuse head 142, a primary explosive 143 and a base charge 144 etc. When the switch circuit 138 for initiation is short-circuited (i.e. the switch circuit 138 is altered from an opened to a closed state), electric power (energy for ignition) is fed from the power storage device 127 for driving the electronic circuit to the ignition circuit 141 such that the fuse head 142 is ignited. When the fuse head 142 is ignited, the primary explosive 143 and the base charge 144 are in turn ignited, thereby igniting the initiator 14 as a whole. When the initiator 14 is ignited, the primary charge explosive 201 with the wireless detonator is initiated.

FIG. 28 illustrates an example of the physical integration of the detonation side electronic circuit 120 and the detonation side transmitting antenna 18. The detonation side transmitting antenna 18 is formed by printing an antenna portion of the conductor on the scale of about several centimeters on an insulator. It is possible to form the detonation side transmitting antenna 18 on the electronic circuit board comprising the detonation side electronic circuit 120. As shown in the example of FIG. 28, the antenna portion 182 may be printed on a part of a planar (or sheet-shaped) electronic circuit board 129 of an insulator. Therefore, the control unit 139 may comprise the integration of the detonation side electronic circuit 120 and the detonation side transmitting antenna 18 on the electronic circuit board 129, thereby reducing its size as well as improving ease of assembly.

According to the wireless initiation detonation system 1 described in the present exemplary embodiment, the operation frequency is set to be greater than or equal to 100 kHz and less than and equal to 500 kHz. The detonation side receiving antenna 11 of the wireless detonator (antenna dedicated for reception) can efficiently receive the energy for driving the detonation side electronic circuit, as well as the wireless control signals and the initiation signals, at this range of frequencies. Therefore, the number of times of turns of the blasting controller side transmitting antenna 60 (antenna dedicated for transmission) shown in FIG. 1 is wound about the Z-axis can be determined to be once or several times. As electric current at the operation frequency is supplied to the blasting controller side transmitting antenna 60, the electric power is received and fed to the controller portion 12 (detonation side electronic circuit 120) of the wireless detonator 10, and consequently the energy for ignition is stored. The supplied electric power to the blasting controller side transmitting antenna 60 for feeding and storing the electric power to the control portion 12 may be relatively low electric power of about several tens of Watts to several hundreds of Watts. Further, the wireless detonator can be controlled by the control signals superimposed on the electric current (for example, including an ID request signal, an electronic circuit preparation start signal and an initiation execution signal etc.) and the initiation signals.

The blasting controller side receiving antenna 65 (antenna dedicated for reception) may be provided. The frequency of the signal transmitted from the wireless detonator 10 may be determined to be greater than or equal to 100 MHz and less than or equal to 1 GHz. Consequently, the detonation side transmitting antenna 18 (antenna dedicated for transmission) for the wireless detonator can be reduced in size for transmitting at such a frequency. The detonation side transmitting antenna 18 can transmit the response signal more efficiently. The reach distance of the response signal can become longer, for example, about 50 meters.

The detonation side receiving antenna 11 may comprise the tubular coil 119 oriented for Z-axial direction signal coverage, a tubular antenna for Z-axial direction (receiving antenna for Z-axial direction) made of a tubular magnetic body, the sheet-shaped coil 117X oriented for X-axial direction signal coverage, a sheet-shaped antenna for X-axial direction signal coverage (receiving antenna for X-axial direction) made of a tubular magnetic body, the sheet-shaped coil 117Y oriented for Y-axial direction signal coverage, and a sheet-shaped antenna for Y-axial direction signal coverage (receiving antenna for Y-axial direction) made of a tubular magnetic body. The tubular coil 119 oriented for Z-axial direction signal coverage can efficiently receive the energy for driving the detonation side electronic circuit, the wireless control signals and the initiation signals from the magnetic field in the Z-axis direction. The sheet-shaped coil 117X for X-axial direction signal coverage can efficiently receive the energy for driving the detonation side electronic circuit, the wireless control signals and the initiation signals from the magnetic field in the X-axis direction. The sheet-shaped coil 117Y for Y-axial direction signal coverage can efficiently receive the energy for driving the detonation side electronic circuit, the wireless control signals and the initiation signals from the magnetic field in the Y-axis direction. In this way, it is possible to efficiently receive the energy for driving the detonation side electronic circuit as well as the wireless control signals and the ignition signals, no matter where the blast holes 40 are drilled in the blasting face 41 shown in FIG. 1. As shown in FIG. 2, since the explosive is inserted in the tubular detonation side receiving antenna 11, more explosive can be charged in the blast hole and detonation efficiency can be improved.

The detonation side transmitting antenna is provided on an outwardly protruding portion of the detonation side receiving antenna 11 and is spaced apart form and not in contact with the detonation side receiving antenna. The wireless detonator is integrally formed with the detonation side transmitting antenna. Therefore, with this integral configuration, the wireless detonator is more easily charged into the explosive hole than in a case where the detonation side transmitting antenna is separately provided from the detonator and needs to be connected via conductive wires. Furthermore, it is possible to properly avoid disconnection of the conductive wires, which serves to connect the detonation side transmitting antenna and the wireless detonator.

FIGS. 29 to 33 illustrate an auxiliary transmission antenna 19 which serves to complement transmission from the detonation side transmitting antenna 18. As shown in FIG. 2, the wireless detonator 10 may be charged into the furthest depth, at the negative-Z-end of the blast hole 40, where the blast hole 40 is made parallel to the Z-axis. Therefore, the detonation side transmitting antenna 18 for transmitting the response signals from the wireless detonator 10 is also arranged at the negative-Z-end of the blast hole 40. Consequently, due to the increased depth, the transmission signals from the detonation side transmitting antenna 18 may be interrupted by any types of the rocks around the blast hole such that the transmission signals may not be able to be efficiently transmitted toward the blasting controller side receiving antenna 65. Therefore, since the auxiliary transmission antenna 19 for completing the transmission from the detonation side transmission antenna 18 to the blasting controller side receiving antenna 65 may be added to the wireless detonator, the transmission signals can be efficiently transmitted to the blasting controller side receiving antenna.

Figure 29:
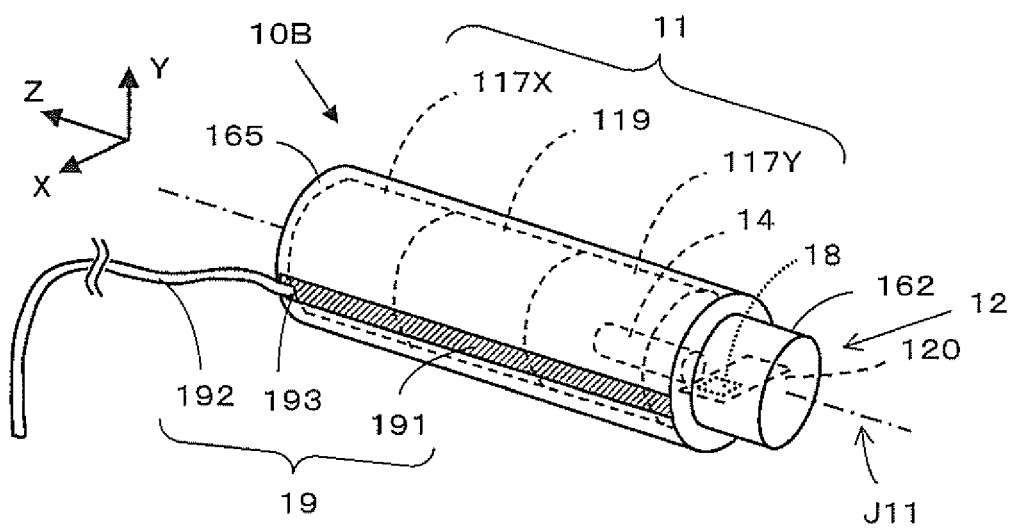
FIG. 29 is a perspective view of the wireless detonator of FIG. 12 with the auxiliary transmission antenna attached to the wireless detonator.
Figure 30:
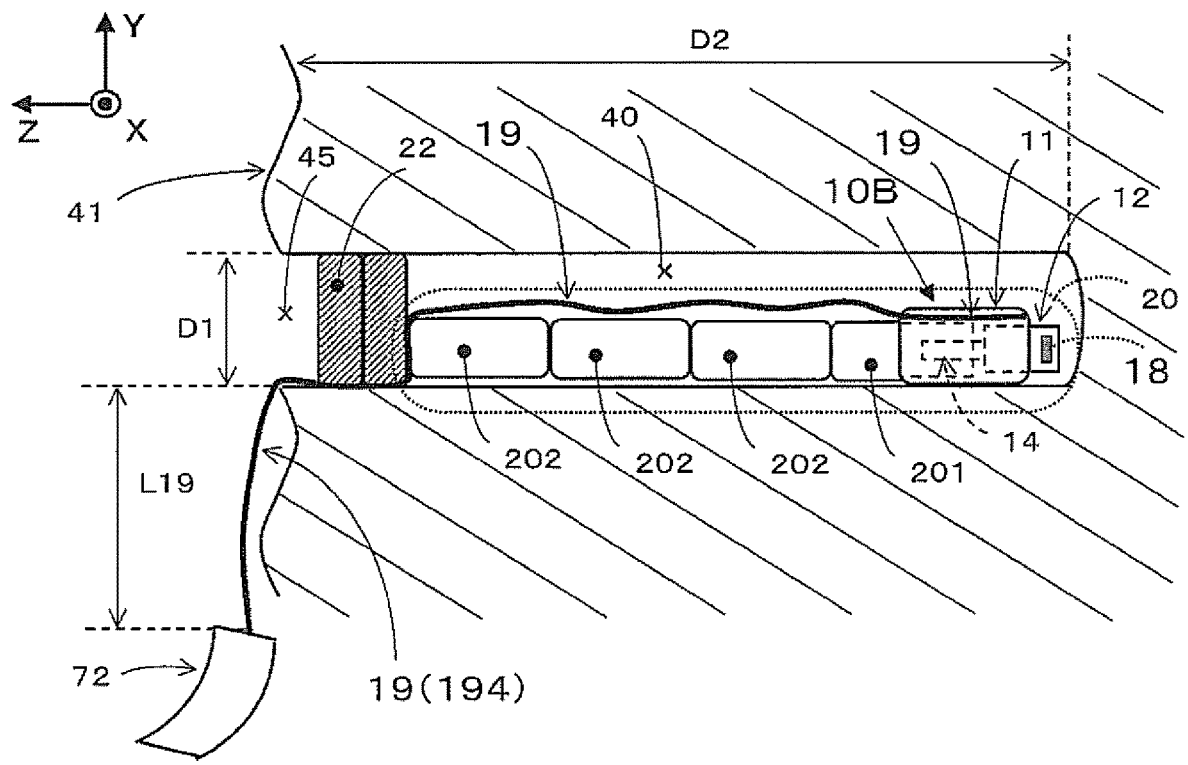
FIG. 30 is a cross-sectional view corresponding to FIG. 2 in which an explosive unit utilizing the wireless detonator shown in FIG. 29 is charged into the blast hole.

FIG. 29 illustrates an example of an appearance of the wireless detonator 10B with the auxiliary transmission antenna 19 that is added to the wireless detonator shown in a cross-section of FIG. 12. The wireless detonator with the detonation side electronic circuit 120, the detonation side receiving antenna 11, the detonation side transmitting antenna 18 and the initiator 14 is accommodated within the control case 162 and the protection case 165 that is a tubular case so as to form the wireless detonator 10B. The shapes of the protection case 165 and the control case 162 are not limited to a cylindrical shape but may be any cross-sectional shape as long as they are tubular. The size of the control case 162 is determined so as to protect and accommodate the detonation side electronic circuit 120 with the detonation side transmitting antenna 18, and its diameter orthogonal to the antenna axis J11 is determined so as to be charged into the blast hole 40 as shown in FIG. 30. The length along the antenna axis J11 of the control case 162 is determined so as to accommodate the detonation side electronic circuit 120 without any loss of space. The size of the protection case 165 is determined so as to be large enough to protect and accommodate the detonation side receiving antenna 11 and the initiator 14. Its diameter in the XY directional plane, orthogonal to the antenna axis J11, is determined so as to accommodate the detonation side receiving antenna 11, and to accommodate a part of the primary charge explosive 201 with the wireless detonator, and to be charged into the blast hole 40 as shown in FIG. 30.

The length along the antenna axis J11 of the protection case 165 is determined so as to accommodate the detonation side receiving antenna 11 and the initiator 14 without any loss of space, and to accommodate at least a part of the primary charge explosive 201 with the wireless detonator as shown in FIG. 30, where the negative-Z-end of the primary charge 201 fits into the initiator 14. The diameter of the control case 162 (diameter orthogonal to the antenna axis J11) and the diameter of the protection case 165 (diameter orthogonal to the antenna axis J11) may be determined such that one is larger than the other, or they may be the same. The length of the control case 162 (length along the antenna axis J11) and the length of the protection case 165 (length along the antenna axis J11) may be determined such that one is longer than the other, or they may be the same. Further, the auxiliary transmission antenna 19 with a predetermined length (the length determined in accordance with the length of the blast hole 40 shown in FIG. 30) is attached to the wireless detonator 10B without being in contact with the detonation side transmitting antenna 18 (being disconnected from the detonation side transmitting antenna 18). The predetermined length of the auxiliary transmission antenna 19 is determined by a guide portion 191 formed of a conductor such as a metal or carbon and a lead portion 192 formed of a conductor such as metal or carbon, while the guide portion 191 and the lead portion 192 are joined at a joint portion 193. The "predetermined length" of auxiliary transmission antenna 19 is determined to be longer than such length that allows a side of the other end of the auxiliary transmission antenna 19 (the side opposite to the side where the protection case or the control case is attached) to reach the opening 45 of the blast hole 40 (i.e. the negative-Z-end of receiving antenna 11 to the positive-Z-end of the blast hole 40, as shown in FIG. 30).

As shown in FIG. 29, the guide portion 191 constitutes one end of the auxiliary transmission antenna 19. The guide portion 191 is not in contact with from the detonation side transmitting antenna 18, and is attached to at least one of an outer or inner side of the protection case 165 or the control case 162. Though the guide portion 191 (auxiliary transmission antenna 19) and the detonation side transmitting antenna 18 are not in contact with each other, the distance of the shortest portion from the guide portion 191 to the detonation side transmission antenna 18 should be preferably as short as possible, for a compact configuration. As shown in FIG. 29, the guide portion 191 may be, for example, adhered to the outer side of the protection case 165. The guide portion 191 may extend from the negative-Z-end to the positive-Z-end of the protection case 165 so as to be parallel to the antenna axis J11. In this case, when the guide portion 191 is formed of a copper foil or an aluminum foil with a predetermined thickness, it can be easily adhered to the case 165 with adhesive tape or the like. The guide portion 191 receives the transmission signals wirelessly transmitted from the detonation side transmitting antenna 18 without contacting the detonation side transmitting antenna 18, and is able to transmit the received transmission signals onward to the lead portion 192. The lead portion 191 has a length corresponding to the length from one end of the protection case 165 to the other end. However, the axial length parallel to the antenna axis J11 of the guide portion 191 is not specifically limited to this configuration. The circumferential width around the antenna axis J11 of the guide portion 191 is determined to be less than or equal to about 10 millimeters so as not to cover the detonation side receiving antenna 11.

As shown in FIG. 29, the lead portion 192 is not in contact with the detonation side transmitting antenna 18 and extends from the positive-Z-end of the auxiliary transmission antenna 19 further in the positive-Z direction, so as to be extend away from the protection case 165 and the control case 162. The lead portion 192 having the conductive wire coated with an insulator is joined to the guide portion 191 by being soldered to the guide portion 191 at the joint portion 193 and extends away from the protection case 165 and the control case 162. The lead portion 192 transmits the transmission signal transmitted from the lead portion 191 from a hanging portion 194 hung from the opening 45 of the blast hole 40 in FIG. 30 toward the blasting controller side receiving antenna 65. In this case, the hanging portion 194 serves as an actual transmitting antenna. The hanging length L19 of the hanging portion 194 in FIG. 30 may preferably be greater than or equal to ¼ of the wave length of the transmission signal. For example, since the wavelength $\lambda$=300,000 (km/s)/315 (MHz)=about 1 meter when the response frequency is 315 MHz, in this case, the hanging length L19 may preferably be determined greater than or equal to about 25 centimeters.

FIG. 30 illustrates a state where the explosive unit using the wireless detonator is charged in the explosive hole 40, when the wireless detonator 10B shown in FIG. 29 is used instead of the wireless detonator of FIG. 2. The auxiliary transmission antenna 19 is pulled out of the opening 45 of the blast hole 40, under the tamping material 22, and comprises the hanging portion 194. The hanging length L19 is preferably longer than or equal to ¼ of the wavelength of the transmission signals, and serves as a transmission antenna. The cable 71 may be omitted if the auxiliary transmission antenna 19, instead of the cable 71 in FIG. 2, is used for the display device 72 to be mounted. In the aforementioned step (b) of charging explosives, as shown in FIG. 30, the explosives for the primary charges 201 with the wireless detonator that is the wireless detonator 10B and the explosives for the secondary charges 202 without wireless detonator that is the wireless detonator 10B (i.e. explosive unit), are charged into the blast holes 40. The other end (the side of the lead portion 192) of the auxiliary transmission antenna 19 is charged into the blast hole 40 so as to be suspended from the opening 45 of the blast hole 40.

Figure 31:
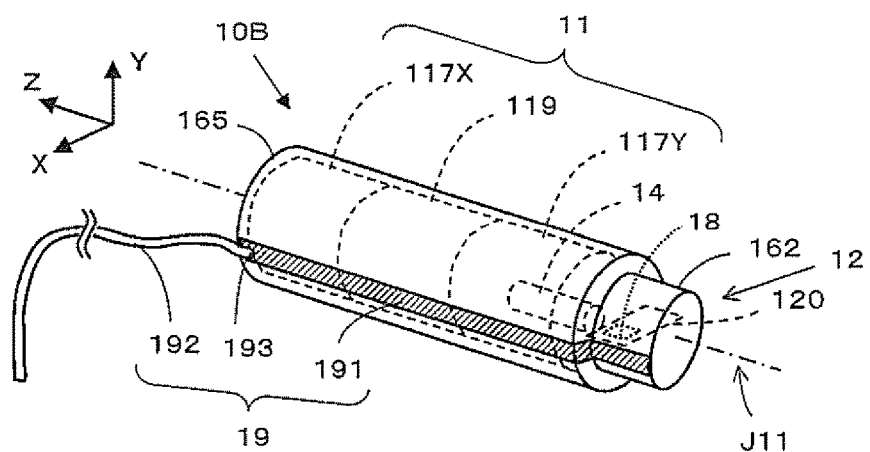
FIG. 31 is a view corresponding to FIG. 29 illustrating another example in an auxiliary transmission antenna attachment state to the wireless detonator.
Figure 32:
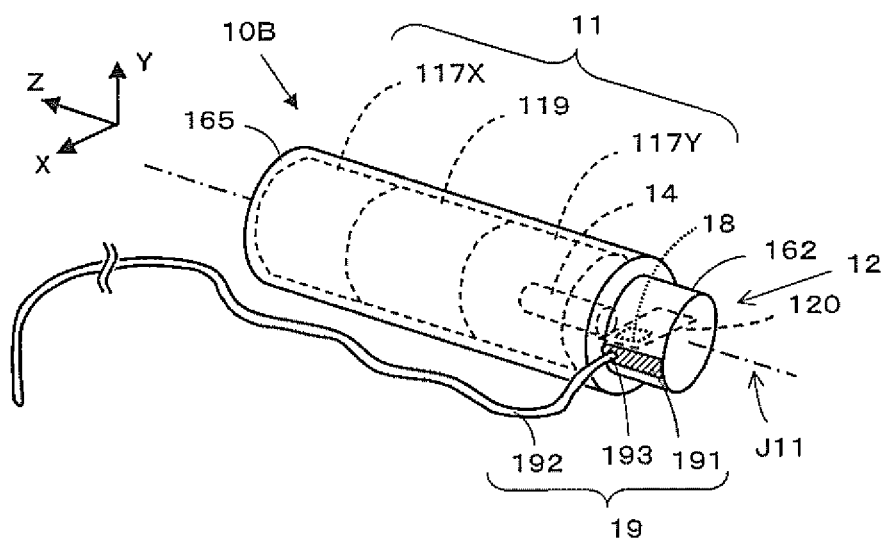
FIG. 32 is a view corresponding to FIG. 29 illustrating another example in an auxiliary transmission antenna attachment state to the wireless detonator.
Figure 33:
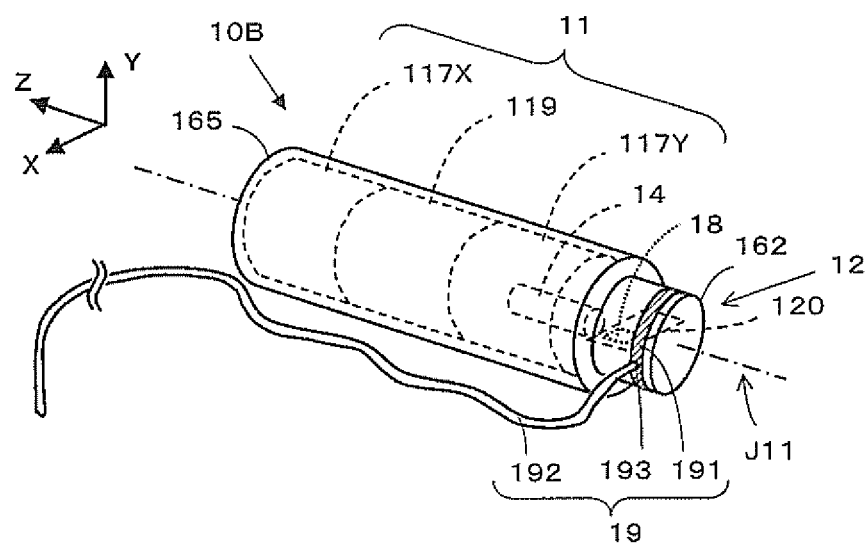
FIG. 33 is a view corresponding to FIG. 29 illustrating another example of an auxiliary transmission antenna attachment state to the wireless detonator.

The guide portion 191 of the auxiliary transmission antenna 19 may be provided in the position shown in FIG. 29 or in the positions shown in FIGS. 31 to 33. The guide portion 191 of FIG. 31 is attached (adhered) from one end to the other end of the protection case 165, or from one end control case 162 to the other end of protection case 165, or from one end to the other end of the control case 162, so as to be substantially parallel to the antenna axis J1. The axial length in parallel with the antenna axis J11 of the guide portion 191 is not limited to these configurations. The circumferential width around the antenna axis J11 of the guide portion 191 is determined to be smaller than or equal to about 10 millimeters so as not to cover the detonation side receiving antenna 11.

The guide portion 191 in FIG. 32 is attached (adhered) from one end to the other end of the control case 162 so as to be substantially parallel to the antenna axis J11. The axial length in parallel with the antenna axis J11 of the guide portion 191 is not specifically limited to this configuration. The circumferential width around the antenna axis J11 of the guide portion 191 is not specifically limited.

The guide portion 191 in FIG. 33 is wound around the control case 162 and attached to the control case 162 so as to circumferentially surround the antenna axis J11, which lies at the radial center of the guide portion 191. The circumferential length around the antenna axis J11 of the guide portion 191 is not specifically limited. The axial width in parallel with the antenna axis J11 of the guide portion 191 is not specifically limited.

The guide portion 191 may be attached to at least either an outer side or inner side of the protection case 165 and the control case 162. For example, in FIG. 29, the guide portion 191 is attached to the outer side of one part of the protection case 165. Alternatively, the guide portion 191 may be attached to the inner side of the protection case 165 or a part of the guide portion 191 may be attached to the inner side of the protection case while the rest of the guide portion 191 may be attached to the outer side of the protection case. The guide portion 191 and the lead portion 192 may be formed of one continuous conductive wire, instead of being soldered at a joint portion 193. In this case, the joint portion 193 can be omitted. Since the auxiliary transmission antenna 19 is not in contact with the detonation side transmitting antenna 18, even when the auxiliary transmission antenna 19 caches static electricity, leakage current (from the surrounding high-voltage wires), or stray current (flowing in the ground for some reasons) present in the blast holes 40, such static electricity or stray current can be prevented from being transmitted to the detonation side electronic circuit 120 via the detonation side transmitting antenna 18. As described-above, various examples are possible as an example of the guide portion 191. However, as a preferred exemplary embodiment of the guide portion 191, it is possible to form the guide portion 191 by adhering a conductive wire (copper wire) having the diameter of about 0.4 millimeters on the surface of the protection case 165 with an adhesive or the like.

The wireless detonators 10, 10A, 10B and 10Z, the wireless detonation system 1 and the wireless detonation method according to the present disclosure are not limited to the appearance, structure, configuration, shape and method described in the present embodiment and various modifications, additions, and removals can be made to the examples in various forms insofar as they do not depart from the scope of the present disclosure.

The axis of the wound conductive wire of the sheet-shaped coil 117X oriented for X-axial direction signal coverage (the axis orthogonal to the axis of the tubular magnetic body) is orthogonal to the axis of the wound conductive wire for the tubular coil 119 for Z-axial direction signal coverage (the longitudinal axis of the tubular magnetic body). The axis of the wound conductive wire of the sheet-shaped coil 117Y oriented for Y-axial direction signal coverage (the axis orthogonal to the axis of the tubular magnetic body) is orthogonal to the axis of the wound conductive wire for the tubular coil 119 for Z-axial direction signal coverage (the longitudinal axis of the tubular magnetic body) and is also orthogonal to the axis of the wound conductive wire for the sheet-shaped coil 117X (the X-axis).

According to the description for the present exemplary embodiment, an example has been described in which the sheet-shaped tubular magnetic body 115 is used as a magnetic body for the detonation side receiving antenna 11, while the tubular coil 119 for Z-axial direction signal coverage, the sheet-shaped coil 117X for X-axial direction signal coverage and the sheet-shaped coil 117Y for Y-axial direction signal coverage are used as the coils for the detonation side receiving antenna 11. However, the shape of the magnetic body for the detonation side receiving antenna 11 may be of any shape and the shape of the detonation side receiving antenna 11, including the coils fitted on the magnetic body, may also be of any shape. Specifically, regarding the receiving antenna 11Z for Z-axis, as long as the conductive wire is wound around the Z-axis and a first magnetic body, the shape of the first magnetic body and the shape of the coil made of the wound conductive wire may have any shape. Similarly, as for the receiving antenna 11X for X-axial direction signal coverage, as long as the conductive wire is wound around the X-axis and a second magnetic body, the shape of the second magnetic body and the shape of the coil made of the wound conductive wire may have any shape. Similarly, as for the receiving antenna 11Y for Y-axial direction signal coverage, as long as the conductive wire is wound around the Y-axis and a third magnetic body, the shape of the third magnetic body and the shape of the coil made of the wound conductive wire may have any shape.

The shape of the detonation side transmitting antenna 18 is not limited to the shape of the antenna portion 182 shown in the example of FIGS. 20 and 28, but may have various other shapes as well.

The wireless detonators 10, 10A, 10B and 10Z, the wireless detonation system 1 and the wireless detonation method as described in the present exemplary embodiment, are not limited to be applied at a tunnel excavation site, and can be applied to explosive operations used at various other blasting sites.

The numerical values used in the description of the present exemplary embodiments are merely one example and the disclosure shall not be limited to these numerical values.

The detonation side receiving antenna 11 described in the present disclosure can receive energy for driving the detonation side electronic circuit, the wireless control signals and the initiation signals more "efficiently" compared to the conventional antenna in which only the tubular antenna for Z-axial direction (receiving antenna for Z-axial direction) is arranged in the blast hole along the Z-axis direction. When the conventional antenna is used at the edge of the blasting controller side transmitting antenna in the charge positions P1a, P1c, P3a and P3c illustrated in an example of, for example, FIG. 4, the case where the energy for driving the detonation side electronic circuit, the wireless control signals and the initiation signals are not sufficiently received. Besides, "efficiently" as used in the disclosure implies that when the detonation side receiving antenna according to the present embodiment is used, the case where the energy for driving the detonation side electronic circuit, the control signals and the initiation signals cannot be sufficiently received, has never occurred after a series of experiments carried out by the inventor(s). In other words, the phrase in that the detonation side receiving antenna 11 as described in the present disclosure "can efficiently receive" implies that it "can more reliably receive" the energy for driving the detonation side electronic circuit, the control signals and the initiation signals as comparing with the aforementioned conventional antenna.

The various exemplary embodiments described above in detail with reference to the accompanying drawings are intended to be representative of the present disclosure and thus non limiting embodiments. The detailed description is intended to teach a person of skill in the art to make, use and/or practice various aspects of the present teachings and thus does not limit the scope of the disclosure in any manner. Furthermore, each of the additional features and teachings disclosed above may be applied and/or used separately or with other features and teachings in any combination thereof, to provide improved wireless detonator, wireless detonation system and the wireless detonation method.

The invention claimed is:

1. A wireless detonator comprising:
a detonation side receiving antenna configured to wirelessly receive energy for driving, a control signal, and an initiation signal;
a detonation side transmitting antenna configured to wirelessly transmit a response signal to the control signal;
an initiator; and
a detonation side electronic circuit configured to receive the energy for driving, the control signal, and the initiation signal via the detonation side receiving antenna, the detonation side electronic circuit configured to transmit the response signal to the control signal via the detonation side transmitting antenna, and the detonation side electronic circuit further configured to ignite the initiator based on the initiation signal;
wherein a response frequency of the response signal transmitted from the detonation side transmitting antenna is set to be greater than or equal to 100 MHz and less than or equal to 1 GHz, and
wherein the detonation side transmitting antenna is disposed in a location to an exterior of the detonation side receiving antenna of the wireless detonator, and is positioned so as to be spaced apart from and not in contact with the detonation side receiving antenna.

2. The wireless detonator of claim 1, wherein the detonation side transmitting antenna is separated from the detonation side electronic circuit and is connected to the detonation side electronic circuit with a conductive wire.

3. The wireless detonator of claim 2, wherein the detonation side transmitting antenna comprises a pair of elevated U-shapes printed on the electronic circuit board, and wherein the U-shapes are rotated 90 degrees from a normal U-shape, and are facing opposite to each other.

4. A wireless detonator comprising:
a detonation side receiving antenna configured to wirelessly receive energy for driving, a control signal, and an initiation signal;
a detonation side transmitting antenna configured to wirelessly transmit a response signal to the control signal;
an initiator; and
a detonation side electronic circuit configured to receive the energy for driving, the control signal, and the initiation signal via the detonation side receiving antenna, the detonation side electronic circuit configured to transmit the response signal to the control signal via the detonation side transmitting antenna, and the detonation side electronic circuit further configured to ignite the initiator based on the initiation signal;
wherein a response frequency of the response signal transmitted from the detonation side transmitting antenna is set to be greater than or equal to 100 MHz and less than or equal to 1 GHz,
wherein a predetermined direction is determined as a Z-axis, an axis orthogonal to the Z-axis is determined as an X-axis, and an axis orthogonal to both the Z-axis and the X-axis is determined as a Y-axis, and
wherein the detonation side receiving antenna comprises a first receiving antenna for a Z-axial direction configured with a first conductive wire wound around the Z-axis and a first magnetic body,
a second receiving antenna for an X-axial direction with a second conductive wire wound around the X-axis and a second magnetic body, and
a third receiving antenna for a Y-axial direction with a third conductive wire wound around the Y-axis and a third magnetic body.

5. The wireless detonator of claim 4, wherein the Z-axis is parallel to a longitudinal axis of the first magnetic body, the second magnetic body, and the third magnetic body.

6. The wireless detonator of claim 4, wherein one integral cylindrical tube with its longitudinal axis at its radial center parallel to the Z-axis forms the first magnetic body, the second magnetic body, and the third magnetic body.

7. The wireless detonator of claim 6, wherein the second receiving antenna for the X-axial direction, the first receiving antenna for the Z-axial direction, and the third receiving antenna for the Y-axial direction, are adjacent to one another in the Z direction, in that order, from a positive-Z-end to a negative-Z-end of the antenna.

8. The wireless detonator of claim 7, wherein if the integral cylindrical tube is pivoted 90 degrees about the Z-axis, then the third receiving antenna for the Y-axial direction pre-rotation becomes a fourth receiving antenna for the X-axial direction post-rotation, and the second receiving antenna for the X-axial direction pre-rotation becomes a fifth receiving antenna for the Y-axial direction post-rotation.

9. The wireless detonator of claim 7, wherein the detonation side transmitting antenna is integrated with the detonation side electronic circuit, wherein the detonation side transmitting antenna and the detonation side electronic circuit are printed on a same electronic circuit board.

10. The wireless detonator of claim 9, wherein the detonation side transmitting antenna comprises a pair of elevated U-shapes printed on the electronic circuit board, and wherein the U-shapes are rotated 90 degrees from a normal U-shape and are facing opposite to each other.

11. The wireless detonator of claim 10, wherein the detonation side transmitting antenna is connected to the detonation side electronic circuit through a built-in wiring pattern on the electronic circuit board.

12. The wireless detonator of claim 9, where the detonation side electronic circuit comprises a three-axis synthetic circuit, which receives signaling from tuning circuits that are connected to the second receiving antenna for the X-axial direction, the third receiving antenna for the Y-axial direction, and the first receiving antenna for the Z-axial direction.

13. The wireless detonator of claim 12, wherein the three-axis synthetic circuit combines energy that is input from the second receiving antenna for the X-axial direction, the third receiving antenna for the Y-axial direction, and the first receiving antenna for the Z-axial direction and outputs the combined energy to a portion of the detonation side electronic circuit where the combined energy is rectified, stored, and converted to a constant voltage for powering a CPU of the detonation side electronic circuit.

14. A wireless detonator comprising:
a detonation side receiving antenna configured to wirelessly receive energy for driving, a control signal, and an initiation signal;
a detonation side transmitting antenna configured to wirelessly transmit a response signal to the control signal;
an initiator; and
a detonation side electronic circuit configured to receive the energy for driving, the control signal, and the initiation signal via the detonation side receiving antenna, the detonation side electronic circuit configured to transmit the response signal to the control signal via the detonation side transmitting antenna, and the detonation side electronic circuit further configured to ignite the initiator based on the initiation signal;
wherein a response frequency of the response signal transmitted from the detonation side transmitting antenna is set to be greater than or equal to 100 MHz and less than or equal to 1 GHz,
wherein the wireless detonator is accommodated in a tubular case and comprises an auxiliary transmission antenna that is made of a conductive material with a predetermined length so as to complement a transmission from the detonation side transmitting antenna,
wherein the auxiliary transmission antenna comprises a lead portion and a guide portion,
wherein the guide portion is formed as one end of the auxiliary transmission antenna and is attached to at least either an outer side or an inner side of a part of the tubular case,
wherein the lead portion is formed as another end of the auxiliary transmission antenna and extends away from the tubular case, and
wherein the auxiliary transmission antenna is spaced apart from and not in contact with the detonation side transmitting antenna.

15. The wireless detonator of claim 14, wherein the auxiliary transmission antenna, while spaced apart from and not in contact with the detonation side transmitting antenna, is proximally adjacent to the detonation side transmitting antenna.

16. A wireless detonation system comprising:
the wireless detonator of claim 1;
an explosive to which the wireless detonator is attached, wherein the explosive is charged into a blast hole drilled into a location to be blasted;
a blasting controller side transmitting antenna stretched on a blasting face or around an outer periphery of the blasting face;
a blasting controller side receiving antenna which is a different antenna from the blasting controller side transmitting antenna, and is arranged at a depth of 0 m to 100 m in the blast hole; and
a blasting controller arranged in a remote location away from the blast hole, and wherein the blasting controller is configured to wirelessly transmit the energy for driving, the control signal, and the initiation signal to the wireless detonator and to wirelessly receive the response signal from the wireless detonator.

17. A wireless detonation system comprising:
the wireless detonator of claim 14;
an explosive to which the wireless detonator is attached, and wherein the explosive is charged into a blast hole drilled in a location to be blasted, while the explosive is charged into the blast hole so that the other end of the auxiliary transmission antenna is suspended from an opening of the blast hole;
a blasting controller side transmitting antenna stretched on a blasting face or around an outer periphery of the blasting face;
a blasting controller side receiving antenna which is a different antenna from the blasting controller side transmitting antenna, and is arranged at a depth of 0 m to 100 m in the blast hole; and
a blasting controller arranged in a remote location away from the blast hole, and wherein the blasting controller is configured to wirelessly transmit the energy for driving, the control signal, and the initiation signal to the wireless detonator and to wirelessly receive the response signal from the wireless detonator.

18. A wireless detonation method utilizing the wireless detonator of claim 1, the wireless detonation method comprising:
(a) a step of drilling a blast hole;
(b) a step of charging explosives;
(c) a step of installing a blasting controller side transmitting antenna;
(d) a step of installing a blasting controller side receiving antenna;
(e) a step of transmitting an electronic circuit preparation start signal;
(f) a step of transmitting a response signal indicative of an electronic circuit preparation completion;
(g) a step of transmitting an initiation signal; and
(h) a blasting step, wherein:
in the step (a) of drilling the blast hole, the blast hole is drilled in a location to be blasted,
in the step (b) of charging the explosives, a primary charge explosive with the wireless detonator and a secondary charge explosive without a wireless detonator are charged into the blast hole,
in the step (c) of installing the blasting controller side transmitting antenna, the blasting controller side transmitting antenna is extended in a loop shape at a position away from a location to be blasted at a first predetermined distance,
in the step (d) of installing the blasting controller side receiving antenna, the blasting controller side receiving antenna is installed at a position away from the location to be blasted at a second predetermined distance,
in the step (e) of transmitting the electronic circuit preparation start signal, a blasting controller transmits the electronic circuit preparation start signal with an operation frequency of greater than or equal to 100 kHz and less than or equal to 500 kHz via the blasting controller side transmitting antenna to the wireless detonator, wherein the electronic circuit preparation start signal comprises the control signal, which starts an electronic circuit preparation, and the energy for driving,
in the step (f) of transmitting the response signal indicative of the electronic circuit preparation completion, the wireless detonator receives the electronic circuit preparation start signal via the detonation side receiving antenna, the wireless detonator starts the electronic circuit preparation, which comprises charging the energy for driving and driving of the detonation side electronic circuit, and when the electronic circuit preparation has completed, an electronic circuit preparation complete signal, which is the response signal indicative for completion of the electronic circuit preparation, is transmitted from the wireless detonator to the blasting controller via the detonation side transmitting antenna with the response frequency, in the step (g) of transmitting the initiation signal, the blasting controller transmits the initiation signal with the operation frequency via the blasting controller side transmitting antenna to the wireless detonator after the blasting controller has received the electronic circuit preparation complete signal via the blasting controller side receiving antenna, and in the blasting step (h), the wireless detonator receives the initiation signal via the detonation side receiving antenna and the wireless detonator ignites and initiates the initiator from the detonation side electronic circuit using the charged energy for driving.

19. A wireless detonation method utilizing the wireless detonator of claim 14, the wireless detonation method comprising:

(a) a step of drilling a blast hole;
(b) a step of charging explosives;
(c) a step of installing a blasting controller side transmitting antenna;
(d) a step of installing a blasting controller side receiving antenna;
(e) a step of transmitting an electronic circuit preparation start signal;
(f) a step of transmitting a response signal indicative of an electronic circuit preparation completion;
(g) a step of transmitting an initiation signal; and
(h) a blasting step, wherein:

in the step (a) of drilling the blast hole, the blast hole is drilled in a location to be blasted, in the step (b) of charging explosives, a primary charge explosive with a wireless detonator and a secondary charge explosive without a wireless detonator, are charged into the blast hole, while the explosives are charged into the blast hole so that the other end of the auxiliary transmission antenna is suspended from an opening of the blast hole, in the step (c) of installing the blasting controller side transmitting antenna, the blasting controller side transmitting antenna is extended in a loop shape at a position away from a location to be blasted at a first predetermined distance, in the step (d) of installing the blasting controller side receiving antenna, the blasting controller side receiving antenna is installed at a position away from the location to be blasted at a second predetermined distance, in the step (e) of transmitting the electronic circuit preparation start signal, the electronic circuit preparation start signal with an operation frequency of greater than or equal to 100 kHz, and less than or equal to 500 kHz, is transmitted from a blasting controller to the wireless detonator via the blasting controller side transmitting antenna, wherein the electronic circuit preparation start signal comprises the control signal, which starts an electronic circuit preparation, and the energy for driving, in the step (f) of transmitting the response signal indicative of the electronic circuit preparation completion, the wireless detonator receives the electronic circuit preparation start signal via the detonation side receiving antenna, the wireless detonator starts the electronic circuit preparation, which comprises charging the energy for driving and driving of the detonation side electronic circuit, and when the electronic circuit preparation has completed, an electronic circuit preparation complete signal, which is the response signal indicative for completion of the electronic circuit preparation, is transmitted from the wireless detonator to the blasting controller via the detonation side transmitting antenna with the response frequency, in the step (g) of transmitting the initiation signal, the blasting controller transmits the initiation signal with the operation frequency to the wireless detonator via the blasting controller side transmitting antenna after the blasting controller has received the electronic circuit preparation complete signal via the blasting controller side receiving antenna, in the blasting step (h), the wireless detonator receives the initiation signal via the detonation side receiving antenna, and the wireless detonator ignites and initiates the initiator from the detonation side electronic circuit using the charged energy for driving.

* * * * *